(12) United States Patent  
Ishizuka et al.

(10) Patent No.: US 7,865,293 B2  
(45) Date of Patent: Jan. 4, 2011

(54) FUEL INJECTION CONTROL DEVICE

(75) Inventors: Koji Ishizuka, Chita-gun (JP); Kenichiro Nakata, Kariya (JP)

(73) Assignee: Denso Corporation, Kariya (JP)

( * ) Notice: Subject to any disclaimer, the term of this patent is extended or adjusted under 35 U.S.C. 154(b) by 218 days.

(21) Appl. No.: 12/179,235

(22) Filed: Jul. 24, 2008

(65) Prior Publication Data

US 2009/0055084 A1 Feb. 26, 2009

(30) Foreign Application Priority Data

Aug. 23, 2007 (JP) ............... 2007-217261

(51) Int. Cl.
*F02M 51/00* (2006.01)
*F02M 51/06* (2006.01)

(52) U.S. Cl. .................... 701/104; 123/486

(58) Field of Classification Search .......... 701/104, 701/103, 102, 105; 123/486, 494, 472, 478, 123/480, 447, 456, 299, 300, 304, 305
See application file for complete search history.

(56) References Cited

U.S. PATENT DOCUMENTS

| | | | |
|---|---|---|---|
| 6,142,121 A | 11/2000 | Nishimura et al. | |
| 6,807,947 B2 * | 10/2004 | Coates et al. | 123/490 |
| 7,021,278 B2 | 4/2006 | Ishizuka et al. | |
| 7,210,458 B2 | 5/2007 | Walther et al. | |
| 7,320,311 B2 | 1/2008 | Futonagane et al. | |
| 7,472,689 B2 | 1/2009 | Ishizuka et al. | |
| 2002/0000218 A1 * | 1/2002 | Rueger et al. | 123/498 |
| 2005/0257777 A1 | 11/2005 | Ishizuka et al. | |
| 2006/0005816 A1 | 1/2006 | Ishizuka et al. | |
| 2006/0130569 A1 | 6/2006 | Walther et al. | |
| 2006/0144367 A1 | 7/2006 | Futonagane et al. | |

FOREIGN PATENT DOCUMENTS

| | | |
|---|---|---|
| JP | 2001-304027 | 10/2001 |
| JP | 2002-201989 | 7/2002 |

(Continued)

OTHER PUBLICATIONS

JP2005337138 (Tatsunobu Hattor) Dec. 8, 2005 (machine translation). [online] [retrieved on Apr. 29, 2010]. Retrieved from: JPO Database.*

(Continued)

*Primary Examiner*—Mahmoud Gimie
(74) *Attorney, Agent, or Firm*—Nixon & Vanderhye P.C.

(57) ABSTRACT

A fuel injection control device (ECU) for controlling injection supply of fuel to a target engine includes a program for sequentially sensing fuel pressure fluctuating with injection of a predetermined injector of each cylinder of a multi-cylinder engine based on an output of a fuel pressure sensor, a program for detecting a diagram as a profile of a transition of a fuel quantity injected from the injector per unit time (i.e., an injection rate) at a present time based on the sequentially sensed fuel pressure transition, and a program for varying an injection command to the injector based on the diagram that is the profile of the injection rate transition and that is detected by the latter program and a predetermined basic diagram such that the diagram as the actual profile of the injection rate transition belongs to the basic diagram.

31 Claims, 16 Drawing Sheets

FOREIGN PATENT DOCUMENTS

| JP | 2005-337138 | 12/2005 |
|---|---|---|
| JP | 2007-064202 | 3/2007 |
| WO | WO 01/86132 | 11/2001 |
| WO | WO 01/90556 | 11/2001 |

OTHER PUBLICATIONS

Japanese Office Action dated Apr. 14, 2009, issued in corresponding Japanese Application No. 2007-217261, with English translation.
U.S. Appl. No. 11/930,668, Koji Ishizuka et al., filed Oct. 31, 2007, (JP2006-307399 and JP2007-210259).
Extended European Search Report dated Feb. 23, 2010, issued in corresponding European Application No. 08161309.3-1263.
U.S. Appl. No. 12/186,038, Kenichiro Nakata et al., filed Aug. 5, 2008.
U.S. Appl. No. 12/187,638, Kenichiro Nakata et al., filed Aug. 7, 2008.
U.S. Appl. No. 12/189,376, Kenichiro Nakata et al., filed Aug. 11, 2008.
U.S. Appl. No. 12/194,130, Kenichiro Nakata et al., filed Aug. 19, 2008.
U.S. Appl. No. 12/194,917, Kenichiro Nakata et al., filed Aug. 20, 2008.
U.S. Appl. No. 12/195,609, Kenichiro Nakata et al., filed Aug. 21, 2008.
U.S. Appl. No. 12/197,447, Kenichiro Nakata et al., filed Aug. 25, 2008.
U.S. Appl. No. 12/201,426, Kenichiro Nakata et al., filed Aug. 29, 2008.
U.S. Appl. No. 12/210,409, Koji Ishizuka et al., filed Sep. 15, 2008.
U.S. Appl. No. 12/210,440, Kenichiro Nakata et al., filed Sep. 15, 2008.
U.S. Appl. No. 12/233,800, Kenichiro Nakata et al., filed Sep. 19, 2008.
U.S. Appl. No. 12/235,917, Kenichiro Nakata et al., filed Sep. 23, 2008.
U.S. Appl. No. 12/236,882, Koji Ishizuka et al., filed Sep. 24, 2008.
U.S. Appl. No. 12/255,936, Koji Ishizuka et al., filed Oct. 22, 2008.
U.S. Appl. No. 12/256,100, Koji Ishizuka et al., filed Oct. 22, 2008.
U.S. Appl. No. 12/258,726, Koji Ishizuka et al., filed Oct. 27, 2008.
U.S. Appl. No. 12/258,750, Koji Ishizuka et al., filed Oct. 27, 2008.
Japanese Office Action dated Aug. 18, 2009, issued in corresponding Japanese Application No. 2007-217261, with English translation.

* cited by examiner

| | P (BASE PRESSURE) | |
|---|---|---|
| | (LOW) ⟶ (HIGH) | |
| Tc | (LONG) ⟶ (SHORT) | |

| | INJECTION PERIOD (TQ) | |
|---|---|---|
| | (SHORT) ⟶ (LONG) | |
| Tc | (SHORT) ⟶ (LONG) | |

FUEL INJECTION CONTROL DEVICE

CROSS REFERENCE TO RELATED APPLICATION

This application is based on and incorporates herein by reference Japanese Patent Application No. 2007-217261 filed on Aug. 23, 2007.

BACKGROUND OF THE INVENTION

1. Field of the Invention

The present invention relates to a fuel injection control device that is applied to a fuel supply system injecting fuel through a predetermined injector and that controls a fuel injection characteristic of the system.

2. Description of Related Art

As one of technologies for improving emission of an in-vehicle diesel engine or the like, there is a known technology (high-pressure injection) for injecting and supplying fuel, which is pressurized to high pressure, directly into a cylinder through an injector. In recent years, a common rail fuel injection system (for example, a system described in Patent document 1: JP-A-H10-220272) has come to attract attention as a fuel injection system realizing the high-pressure injection. In the system, the fuel pumped from a fuel pump is accumulated in a common rail in a high-pressure state, and the accumulated high-pressure fuel is supplied to the injectors of respective cylinders through pipes (high-pressure fuel passages) provided to the respective cylinders. In the system, a predetermined pressure sensor (a rail pressure sensor) is provided to the common rail. The system is configured to control drive of various devices constituting a fuel supply system based on an output (a sensor output) of the rail pressure sensor.

Conventionally, in the case where an injection operation of the injector is controlled with such the common rail fuel injection system, a control method of setting an injection pattern in accordance with an engine operation state of each time with reference to a map (an adaptation map), in which the injection pattern (i.e., the adaptation value) for each anticipated engine operation state is written, or a mathematical expression is widely adopted. The device stores the optimum pattern (i.e., the adaptation value), which is beforehand obtained for each anticipated engine operation state through experiment and the like, as the map, the mathematical expression or the like (in ROM, for example). Thus, the device sets the injection pattern corresponding to the engine operation state with reference to the map, the mathematical expression or the like.

Thus, fuel supply to the engine can be performed in an injection mode (i.e., the injection pattern) suitable for the engine operation state of each time by using the map, in which the adaptation values are written, or the mathematical expression. However, when mass production and mass marketing of respective components of the engine control system are performed, usually, there occur certain individual differences in characteristics of various kinds of control components including the injector, for example, between the engines and also between the cylinders in the case of a multi-cylinder engine. In such the case, it takes a lot of works and is not realistic for the present production system to obtain the adaptation values (the optimum injection patterns) for all the components (for example, all the cylinders manufactured through the mass production and mounted in the vehicles) in consideration also of the individual differences. Therefore, it is difficult to perform the control in consideration of all the influences due to the individual differences even when the map, in which the adaptation values are written, or the mathematical expression is used.

In order to perform the injection control with high accuracy, a characteristic change resulting from aging of the control components and the like is not negligible. Even if the conventional device such as the device described in Patent document 1 can obtain the optimum value with high accuracy in an early stage, an influence of the subsequent characteristic change is unknowable. Therefore, there is a concern that there occurs a deviation from the optimum value with passage of time. In this case, an adaptation value of a degradation factor (a coefficient concerning a degree of degradation with time) may be beforehand obtained with an experimental value and the like and may be stored as a map, a mathematical expression or the like. However, there is also the above-mentioned individual difference in the temporal characteristic change of every component. Therefore, it is difficult to thoroughly remove the influence.

SUMMARY OF THE INVENTION

It is an object of the present invention to provide a fuel injection control device capable of performing appropriate fuel injection control in accordance with an injection characteristic of each time including a characteristic change with time.

According to an aspect of the present invention, a fuel injection control device controls a fuel injection characteristic at the time when performing injection supply of fuel to a target engine and is applied to a fuel supply system that injects fuel to an inside of a cylinder as a part of the target engine for performing fuel combustion, to an intake passage of the engine or to an exhaust passage of the engine with a predetermined injector. The fuel injection control device includes a fuel pressure sensing section, a diagram detecting section and an injection varying section. The fuel pressure sensing section sequentially senses fuel pressure fluctuating with the injection of the injector. The diagram detecting section detects a diagram as a profile of a transition of an injection rate at the time equivalent to a fuel quantity injected from the injector per unit time based on a transition of the fuel pressure sequentially sensed by the fuel pressure sensing section. The detected profile diagram is a triangle, a trapezoid, or a boot shape, for example. The injection varying section varies an injection command to the injector or an injection condition of the injector based on the diagram that is the profile of the transition of the injection rate and that is detected by the diagram detecting section and a predetermined basic diagram such that the diagram as the actual profile of the transition of the injection rate becomes a diagram belonging to the basic diagram.

The inventors invented the above device by paying an attention to the phenomenon that the injection characteristic changes if the diagram as the profile of the injection rate transition changes even when the injection is performed with the same injection quantity. That is, with the device, the diagram as the profile of the injection rate transition at the time can be detected with the diagram detecting section. Moreover, the injection varying section can vary the injection command to the target injector or the injection condition of the injector such that the diagram as the actual profile of the injection rate transition becomes the same kind as the predetermined basic diagram in the same combustion cycle or in the subsequent combustion cycle. Therefore, with the above-described construction, the injection characteristic can be adjusted in accordance with the injection characteristic of each time, thereby enabling appropriate fuel injection control.

According to another aspect of the present invention, the basic diagram is one of a triangle, a trapezoid and a rectangle or a diagram made by combining multiple pieces of at least one kind of the triangle, the trapezoid and the rectangle.

When a general injector is adopted, the diagram as the profile of the injection rate transition corresponds to either one of the above-described shapes. Therefore, such the construction is effective when the general injector is adopted in the device according to the above aspect of the present invention.

According to another aspect of the present invention, the fuel injection control device further has a basic diagram varying section for variably setting at least one of the basic diagram (such as a triangle or a trapezoid) and a parameter of the basic diagram based on a predetermined parameter. For example, the predetermined parameter is a fuel injection condition such as injection pressure, an operation state of the engine such as engine rotation speed or request torque based on an operation manipulation by an operator.

With such the construction, the basic diagram (the kind of the basic diagram) or the parameter of the basic diagram can be changed in accordance with the situation of each time, and eventually, the above-described device can be realized in a more practical form. The basic diagram varying section can be easily and appropriately realized by using a map or the like.

According to another aspect of the present invention, the injection varying section varies the injection command to the injector or the injection condition of the injector based on the diagram that is the profile of the transition of the injection rate and that is detected by the diagram detecting section and the basic diagram such that the diagram as the actual profile of the transition of the injection rate becomes a diagram having the same area as the basic diagram.

The area of the diagram as the profile of the injection rate transition is equivalent to a fuel injection quantity (an injection quantity concerning the injection). Torque outputted by the engine is decided mainly by magnitude of the fuel injection quantity. Therefore, in the fuel injection control concerning engine control it is important to control the fuel injection quantity to desired magnitude. The device according to the above aspect can make the diagram as the actual profile of the injection rate transition become a diagram that belongs to the basic diagram and also has the same area as the basic diagram. Accordingly, the device can perform appropriate fuel injection control.

According to another aspect of the present invention, the injection varying section varies the injection command to the injector or the injection condition of the injector based on the diagram that is the profile of the transition of the injection rate and that is detected by the diagram detecting section and the basic diagram such that at least one of timing of a corner or an injection rate defined by the diagram as the actual profile of the transition of the injection rate coincides with that of the basic diagram.

In the fuel injection control concerning the engine control, in addition to the fuel injection quantity, a period to perform the injection in the injection period and a degree of a fuel quantity to inject in the period are also important. The timings of the corners and the injection rate defined by the diagram are main factors that decide such the characteristics. The device according to the above aspect can make the diagram as the actual profile of the injection rate transition belong to the basic diagram and also can coincide the timings of the corners and the injection rate of the diagram of the profile to those of the basic diagram. Accordingly, the device can perform appropriate fuel injection control.

According to another aspect of the present invention, the injection varying section varies the injection command to the injector or the injection condition of the injector by comparing the diagram detected by the diagram detecting section with the basic diagram to approximate a predetermined parameter of the detected diagram (such as the area, the timings of the corners or the injection rate) to a corresponding parameter of the basic diagram.

In order to perform the appropriate fuel injection control, it is important to conform or approximate the diagram (which is equivalent to a diagram detected by the diagram detecting section) as the actual profile of the injection rate transition to the basic diagram. With the above-described construction, the device according to the aspect can conform or approximate the detected diagram to the basic diagram by approximating the predetermined parameter of the detected diagram to the corresponding parameter of the basic diagram. Eventually, the device can perform the appropriate fuel injection control.

According to another aspect of the present invention, the basic diagram is the trapezoid, and the injection varying section approximates the area of the detected diagram to that of the basic diagram in priority to the timings of four corners or the injection rate defined by the detected diagram.

Usually, the fuel injection quantity mentioned above is specifically important in the fuel injection control concerning the engine control. Therefore, as in the above construction, it is more effective to precisely conform the area of the detected diagram to that of the basic diagram than to precisely conform details of the shape of the detected diagram to those of the basic diagram.

In the case where such the aspect of the present invention is applied to the fuel supply system of the engine, the system applied with the aspect is not necessarily a system that can freely adjust the detected diagram. There is an adjustment limit depending on the system. When trying to conform the area of the detected diagram to the area of the basic diagram in such the system, if it is tried to precisely conform a specific parameter to that of the basic diagram among the various parameters of the diagram, there is a possibility that the other parameter deviates from that of the basic diagram. Therefore, the device according to the above aspect of the present invention beforehand decides a parameter to be adjusted in priority.

According to another aspect of the present invention, the injection varying section approximates a first corner of the trapezoid that appears at the earliest timing in a chronological order among the four corners of the detected diagram to that of the basic diagram in priority to a fourth corner of the trapezoid that appears at the latest timing in the chronological order among the four corners.

Usually, in the fuel injection control concerning the engine control injection start timing is more important than injection end timing. Therefore, in order to perform appropriate fuel injection control, it is specifically effective to precisely conform the first corner of the trapezoid to that of the basic diagram in priority to the fourth corner as in the construction according to the above aspect.

According to another aspect of the present invention, the injection varying section approximates the four corners of the detected diagram to those of the basic diagram in a priority order of the first corner of the trapezoid that appears at the earliest timing in the chronological order, the fourth corner of the trapezoid that appears at the latest timing in the chronological order, a second corner of the trapezoid that appears at second timing in the chronological order, and a third corner of the trapezoid that appears at third timing in the chronological order. Thus, appropriate fuel injection control can be performed.

According to another aspect of the present invention, the basic diagram is the trapezoid, and the injection varying section compares the detected diagram detected by the diagram detecting section and the basic diagram and produces the injection command to the injector such that rising timings (injection start timings) of the first corners of the both diagrams coincide with each other if a deviation amount between the rising timings of the first corners is greater than a permissible level when both of the detected diagram and the basic diagram are the trapezoids and a deviation amount between rising angles of the first corners of the detected diagram and the basic diagram is within another permissible level. The first corner of the detected diagram or the basic diagram appears at the earliest timing among four corners of the trapezoid in a chronological order.

According to another aspect of the present invention, the basic diagram is the trapezoid, and the injection varying section compares the detected diagram detected by the diagram detecting section and the basic diagram and produces the injection command to the injector such that return timings of fourth corners (i.e., injection end timings) of the both diagrams coincide with each other if a deviation amount between the return timings of the fourth corners is greater than a permissible level when both of the detected diagram and the basic diagram are the trapezoids and a deviation amount between return angles of the fourth corners of the detected diagram and the basic diagram is within another permissible level. The fourth corner of the detected diagram or the basic diagram appears at the latest timing among four corners of the trapezoid in a chronological order.

According to another aspect of the present invention, the basic diagram is the trapezoid, and the injection varying section compares the detected diagram detected by the diagram detecting section and the basic diagram and produces the injection command to the injector to move rising timing of a first corner of the trapezoid of the detected diagram and stabilization timing of a second corner of the trapezoid of the detected diagram in a direction for coinciding an area of the detected diagram with an area of the basic diagram without performing adjustment of a rising angle of the first corner when both of the detected diagram and the basic diagram are the trapezoids and a deviation amount between rising angles of the first corners of the detected diagram and the basic diagram is greater than a permissible level. The first corner of the trapezoid appears at the earliest timing among four corners of the trapezoid in a chronological order and the second corner appears at second timing among the four corners of the trapezoid in the chronological order.

With such the construction, the detected diagram can be conformed or approximated to the basic diagram easily and appropriately, and eventually, appropriate fuel injection control can be performed.

According to another aspect of the present invention, when the rising timing of the first corner of the detected diagram coincides with the rising timing of the first corner of the basic diagram, the injection varying section moves each of the rising timing and the stabilization timing of the detected diagram by a half of the deviation amount between the stabilization timings of the second corners of the detected diagram and the basic diagram.

According to another aspect of the present invention, the basic diagram is the trapezoid, and the injection varying section compares the detected diagram detected by the diagram detecting section and the basic diagram and produces the injection command to the injector to move falling timing of a third corner of the trapezoid of the detected diagram and return timing of a fourth corner of the trapezoid of the detected diagram in a direction for coinciding an area of the detected diagram with an area of the basic diagram without performing adjustment of a return angle of the fourth corner of the trapezoid when both of the detected diagram and the basic diagram are the trapezoids and a deviation amount between return angles of the fourth corners of the detected diagram and the basic diagram is greater than a permissible level. The fourth corner of the trapezoid appears at the latest timing among four corners of the trapezoid in a chronological order.

With such the construction, the detected diagram can be conformed or approximated to the basic diagram easily and appropriately, and eventually, appropriate fuel injection control can be performed.

According to another aspect of the present invention, when the return timings of the fourth corners of the detected diagram and the basic diagram coincide with each other, the injection varying section moves each of the falling timing and the return timing of the detected diagram by a half of the deviation amount between the falling timings of the third corners of the detected diagram and the basic diagram.

According to another aspect of the present invention, the injection varying section varies injection pressure of the injector as the injection condition.

The diagram as the profile of the injection rate transition changes in accordance with the injection pressure of the injector. With the device according to the above aspect, the diagram as the actual profile of the injection rate transition can be varied by varying the injection pressure of the injector. When the injector has multiple kinds of switchable injection holes (for example, multiple injection holes having different shapes), the injection pressure of the injector may be varied by switching the injection holes. When the injector has a pressure intensifying mechanism, the injection pressure of the injector may be varied by operating the pressure intensifying mechanism. However, for example, for the application to a general injector, following constructions are specifically effective. That is, according to another aspects of the present invention, the injection varying section varies the injection pressure of the injector by varying a pumping quantity of a fuel pump that performs pumping supply of the fuel to the injector, the injection varying section varies the injection pressure of the injector by varying pumping timing of the fuel pump, or the injection varying section varies the injection pressure of the injector by varying a valve opening degree of a pressure reducing valve provided to the injector or to a fuel supply passage for the injector.

According to another aspect of the present invention, the injection varying section varies the injection command to the injector by updating a correction coefficient for a predetermined reference map, in which the injection command used when the injection control is performed with the injector is written. With such the construction, the injection command to the injector can be varied easily and appropriately.

According to another aspect of the present invention, the injection varying section produces the injection command to the injector such that an injection result obtained based on the fuel pressure transition sequentially sensed with the fuel pressure sensing section during a present combustion cycle of the target engine is reflected in an injection in a subsequent combustion cycle. By continuously performing the production of the injection command while applying such the feedback to the injection command, appropriate fuel injection can be performed over a long period of time.

According to another aspect of the present invention the injection varying section uses a pressure transition sensed up to a present time in a combustion cycle of the target engine based on the fuel pressure transition sequentially sensed by the fuel pressure sensing section to produce the injection command to the injector about a predetermined operation concerning the fuel injection of the injector to be performed after the present time in the same cycle.

Thus, the injection characteristic (equivalent to the pressure transition) is sensed with high simultaneity (i.e., in real time) and the subsequent injection operation is adjusted based on the pressure transition sensed previously Accordingly, an error at the preceding timing can be cancelled. For example, a construction of employing a valve closing operation of the injector as the predetermined operation concerning the fuel injection is effective. With such the construction, the valve closing timing of the injector can be adjusted in accordance with the error of the area (i.e., the injection quantity) of the detected diagram up to the time. Eventually, the injection quantity error resulting from the deviation in the area of the detected diagram can be compensated to appropriately maintain the fuel injection quantity at the time.

According to another aspect of the present invention, the injector has a fluid control valve for controlling an inflow of a fluid to a predetermined space and an outflow of the fluid from the same space and a needle that performs reciprocation operation inside a valve body of the injector in accordance with a change in pressure in the space accompanying the inflow and the outflow of the fluid to open and close an injection hole or a fuel supply passage extending to the injection hole, thereby performing valve opening and valve closing of the injector.

According to another aspect of the present invention, the injector has a needle that performs reciprocation operation inside a valve body of the injector to open and close an injection hole or a fuel supply passage extending to the injection hole, thereby performing valve opening and valve closing of the injector. The injector continuously varies a reciprocation movement amount of the needle in accordance with the injection command to the injector.

According to another aspect of the present invention, the fuel supply system is a common rail fuel injection system that has a common rail for accumulating the fuel to be supplied to the injector under pressure and at least one fuel pressure sensor for sensing pressure of the fuel flowing through an inside of a fuel passage extending from the common rail to a fuel injection hole of the injector at a predetermined point downstream of a neighborhood of a fuel discharge hole of the common rail with respect to a fuel flow direction. The fuel pressure sensing section sequentially senses the fuel pressure based on at least one output of the at least one fuel pressure sensor.

Thus, the fuel pressure sensor is located such that the fuel pressure sensor senses the pressure at a predetermined point downstream of a neighborhood of the fuel discharge hole of the common rail with respect to the fuel flow direction in the fuel passage extending from the common rail to the fuel injection hole of the injector Accordingly, the pressure fluctuation mode due to at least one of the injection operation of the injector concerning a predetermined injection (for example, opening/closing action of an electromagnetic valve in the case of an injector that drives a needle in accordance with opening/closing of the electromagnetic valve) and an actual injection (i.e., injection actually performed through the injection operation) can be appropriately sensed at the installation point of the sensor.

The device described in Patent document 1 mentioned above controls the injection pressure of the injector fundamentally based on only the rail pressure sensor that senses the pressure in the common rail (i.e., the rail pressure). In this device, the pressure fluctuation due to the injection (including the injection operation) attenuates when or before the fluctuation reaches from the fuel injection hole of the injector to the common rail and does not appear as a fluctuation of the rail pressure. Therefore, with such the device, it is difficult to accurately sense the pressure fluctuation caused by the above-described injection.

As contrasted thereto, the device according to the above aspect of the present invention has the fuel pressure sensor that senses the injection pressure at the position closer to the fuel injection hole than the rail pressure sensor (or a sensor provided near the common rail) is. Therefore, the pressure fluctuation due to the injection (including the injection operation) can be grasped appropriately with the pressure sensor before the pressure fluctuation attenuates. With such the device, the injection characteristic can be adjusted appropriately with the injection varying section in accordance with the injection characteristic of each time based on the fuel pressure sequentially sensed with the fuel pressure sensing section, thereby enabling appropriate fuel injection control.

Moreover, in some cases, the fuel injection control device constituting the common rail type fuel injection system is provided with a fuel pulsation reducing section in a connection between the common rail and a fuel discharge pipe of the common rail for reducing a fuel pulsation transmitted to the common rail at the connection through the fuel discharge pipe, aiming to reduce the pressure pulsation in the common rail and to supply the fuel to the injector at stable pressure. In this case, when the pressure fluctuation due to the injection (including the injection operation) arises in the fuel injection hole of the injector and spreads toward the common rail through the common rail fuel discharge pipe, the fuel pulsation out of the pressure fluctuation is reduced (attenuated) by the fuel pulsation reducing section. Therefore, with such the construction, it is difficult to correctly sense the pressure fluctuation mode due to the injection (including the injection operation) based on the pressure in the common rail (i.e., the rail pressure).

According to another aspect of the present invention, the fuel injection control device is applied to a common rail fuel injection system that has the fuel pulsation reducing section and at least one fuel pressure sensor for sensing pressure of the fuel flowing through an inside of a fuel passage extending from the common rail to a fuel injection hole of the injector at a predetermined point downstream of the fuel pulsation reducing section with respect to a fuel flow direction. The fuel pressure sensing section sequentially senses the fuel pressure based on at least one output of the at least one fuel pressure sensor. With such the construction, the pressure fluctuation mode can be sensed with the fuel pressure sensor before the fuel pulsation is reduced by the fuel pulsation reducing section. Eventually, the pressure fluctuation mode can be sensed with high accuracy.

According to another aspect of the present invention, the fuel pulsation reducing section is constituted by an orifice, a flow damper, or a combination of the orifice and the flow damper. With such the construction, the above object can be attained appropriately. Moreover, since the technology for reducing the fuel pulsation with the use of the orifice or the flow damper has been already put in practical use and has actual achievements, thereby possessing high practicality and reliability.

According to another aspect of the present invention, at least one of the fuel pressure sensors is provided inside the injector or near the injector.

The pressure fluctuation mode due to the injection (including the injection operation) can be detected through the sensor output of the pressure sensor with higher accuracy as the installation position of the fuel pressure sensor is closer to the fuel injection hole of the injector. Therefore, in order to sense the pressure fluctuation mode with high accuracy, it is effective to install the fuel pressure sensor inside or near the injector as in the construction according to the above aspect. In this case, if at least one of the fuel pressure sensors is provided to the fuel inlet of the injector, mountability and maintenance performance of the fuel pressure sensor are improved and the pressure can be sensed with high accuracy in a comparatively stable state.

According to another aspect of the present invention, at least one of the fuel pressure sensors is provided at a position in the fuel discharge pipe of the common rail closer to the fuel injection hole of the injector than the common rail. In the device according to the above aspects using the fuel pressure sensor(s), it is important to locate at least one of such the sensors at a position, which is provided closer to the injector than the common rail to the extent that the pressure fluctuation caused in the injector does not attenuate completely before reaching the position. For this purpose, it is desirable to locate the fuel pressure sensor at the position close to the injector.

According to another aspect of the present invention, the fuel pressure sensing section sequentially obtains a sensor output of the fuel pressure sensor at an interval short enough to create a profile of a pressure transition waveform with the sensor output.

The pressure fluctuation mode due to the injection (including the injection operation) can be usually detected as a pressure transition waveform. In order to detect the pressure transition waveform (i.e., the pressure fluctuation mode) appropriately with high accuracy, it is effective to sequentially acquire the sensor output of the fuel pressure sensor at an interval short enough to grasp the pressure transition waveform as in the construction according to the above aspect of the present invention. More specifically, a following configuration is effective.

That is, according to yet another aspect of the present invention, the fuel pressure sensing section sequentially obtains the sensor output of the fuel pressure sensor at an interval shorter than 50 microseconds. In the case where the device according to one of the above aspects of the present invention using the fuel pressure sensor is applied to a presently adopted general common rail system, the construction of sequentially acquiring the sensor output at the interval shorter than 50 microseconds is specifically effective to appropriately grasp the tendency of the pressure fluctuation mentioned above.

However, in order to obtain the above-described pressure fluctuation mode with higher accuracy, a construction of sequentially acquiring the sensor output at as short an interval as possible is desirable. Therefore, usually, the acquisition interval of the sensor output (fuel pressure signal) should be preferably set at as short an interval as possible in consideration of a disadvantage due to the increase in the acquisition time number of the sensor output (for example, a disadvantage due to increase in a computation load).

BRIEF DESCRIPTION OF THE DRAWINGS

Features and advantages of an embodiment will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENT

Hereafter, a fuel injection control device according to an embodiment of the present invention will be described with reference to the drawings. The control device according to the present embodiment is mounted, for example, in a common rail fuel injection system (high-pressure injection fuel supply system) for a diesel engine. That is, like the device described in Patent document 1, the control device according to the present embodiment is used for performing injection supply (direct injection supply) of high-pressure fuel (for example, light oil at injection pressure of 1000 atmospheres or higher) directly into a combustion chamber in a cylinder of a diesel engine.

First, an outline of the common rail fuel injection control system (an in-vehicle engine system) according to the present embodiment will be explained with reference to FIG. 1. It is assumed that the engine according to the present embodiment is a multi-cylinder engine (for example, an in-line four-cylinder engine) for a four-wheeled vehicle. In more detail, it is assumed that the engine according to the present embodiment is a four-stroke reciprocating diesel engine (internal combustion engine). In the engine, the cylinder as a target cylinder at the time is sequentially distinguished by a cylinder determination sensor (an electromagnetic pickup) provided to a camshaft of a suction valve or an exhaust valve. In each of the four cylinders #1-#4, a combustion cycle consisting of four strokes of an intake stroke, a compression stroke, a combustion stroke, and an exhaustion stroke is sequentially performed in an order of the cylinders #1, #3, #4, and #2 in a cycle of 720° CA, for example in more detail, while the combustion cycles are deviated from each other by 180° CA between the cylinders. The injectors 20 shown in FIG. 1 are injectors for the cylinders #1, #2, #3, and #4 from a fuel tank 10 side in this order.

Figure 1:
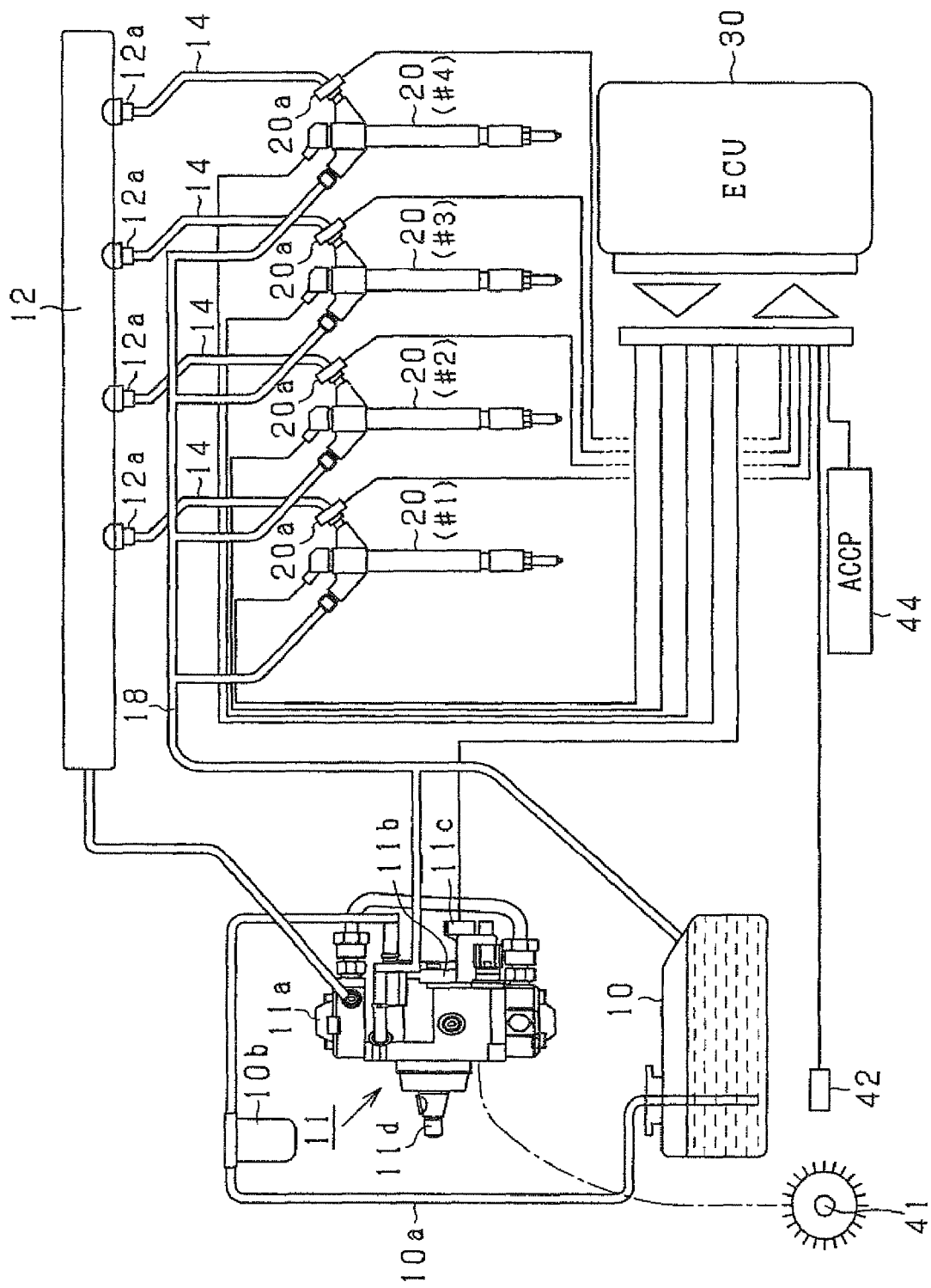
FIG. 1 is a schematic diagram showing an engine control system including a fuel injection control device according to an embodiment of the present invention.

As shown in FIG. 1, generally, the system is structured such that an ECU 30 (electronic control unit) takes in sensor outputs (sensing results) from various sensors and controls drive of respective devices constituting a fuel supply system based on the respective sensor outputs. The ECU 30 adjusts a current supply quantity to a suction control valve 11c, thereby controlling a fuel discharge quantity of a fuel pump 11 to a desired value. Thus, the ECU 30 performs feedback control (for example, PID control) for conforming fuel pressure in a common rail 12 (current fuel pressure measured with a fuel pressure sensor 20a) to a target value (target fuel pressure). The ECU 30 controls a fuel injection quantity to a predetermined cylinder of the target engine and an eventual output of the engine (i.e., rotation speed or torque of an output shaft) of the target engine to desired magnitudes based on the fuel pressure.

The devices constituting the fuel supply system including the fuel tank 10, the fuel pump 11, the common rail 12, and the injectors 20 are connected by predetermined pipes and are located in this order from a fuel upstream side. Among the devices, the fuel tank 10 and the fuel pump 11 are connected by a pipe 10a via a fuel filter 10b.

In such the fuel supply system, the fuel tank 10 is a tank (a vessel) for storing the fuel (light oil) of the target engine. The fuel pump 11 consists of a high-pressure pump 11a and a low-pressure pump 11b and is structured such that fuel drawn by the low-pressure pump 11b from the fuel tank 10 is pressurized and discharged by the high-pressure pump 11a. A fuel pumping quantity sent to the high-pressure pump 11a and the eventual fuel discharge quantity of the fuel pump 11 are metered by the suction control valve 11c (SCV) provided on a suction side of the fuel pump 11. The fuel pump 11 can control the fuel discharge quantity from the pump 11 to a desired value by regulating drive current (eventually, a valve opening degree) of the suction control valve 11c. For example, the suction control valve 11c is a normally-on type metering valve that opens when de-energized.

The low-pressure pump 11b out of the two kinds of pumps constituting the fuel pump 11 is constituted as a trochoid feed pump, for example. The high-pressure pump 11a consists of a plunger pump, for example. The high-pressure pump 11a is structured to be able to sequentially pump the fuel, which is sent to pressurization chambers, at predetermined timing by reciprocating predetermined plungers (for example, three plungers) in axial directions thereof with an eccentric cam (not illustrated) respectively. Both pumps 11a, 11b are driven by a drive shaft 11d. The drive shaft 11d is interlocked with a crankshaft 41 as an output shaft of the target engine and rotates at a ratio of 1/1, 1/2 or the like to one revolution of the crankshaft 41. That is, the low-pressure pump 11b and the high-pressure pump 11a are driven by an output of the target engine.

The fuel drawn by the fuel pump 11 from the fuel tank 10 through the fuel fitter 10b is pressure-fed (pumped) to the common rail 12. The common rail 12 accumulates the fuel pumped from the fuel pump 11 in a high-pressure state. The fuel accumulated in the high-pressure state in the common rail 12 is supplied to the injectors 20 of the respective cylinders #1-#4 through pipes 14 (high-pressure fuel passages) provided to the respective cylinders. An orifice (a restricting section of the pipe 14 as a fuel pulsation reducing device) is provided in a connection section 12a between the common rail 12 and the pipe 14 (a common rail fuel discharge pipe). The orifice reduces a fuel pulsation transmitted to the common rail 12 through the pipe 14. The fuel pulsation is generated mainly in a fuel injection hole of the injector 20 during the injection. Thus, pressure pulsation in the common rail 12 can be reduced and the fuel can be supplied to each injector 20 at stable pressure. Fuel discharge holes of the injectors 20(#1)-20(#4) are connected with a pipe 18 for returning excess fuel to the fuel tank 10.

Figure 2:
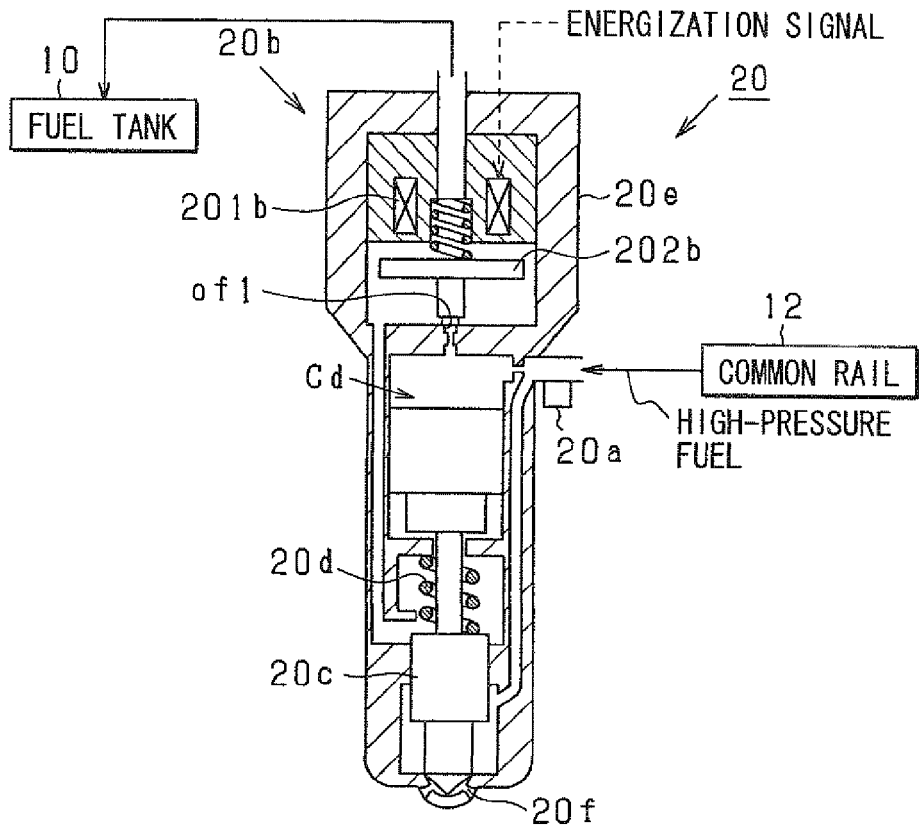
FIG. 2 is a schematic cross-sectional diagram showing an internal structure of an injector used in the system according to the embodiment.

A detailed structure of the injector 20 is shown in FIG. 2. Basically, the four injectors 20(#1)-20(#4) have the same structure (for example, a structure shown in FIG. 2). Each injector 20 is a hydraulic drive type injector using the engine fuel to be combusted (i.e., the fuel in the fuel tank 10). In the injector 20, a driving power for the fuel injection is transmitted through an oil pressure chamber Cd (i.e. a command chamber).

As shown in FIG. 2, the injector 20 is a fuel injection valve of an inward-opening valve type. The injector 20 is structured as a fuel injection valve of a normally-closed type that is brought to a valve-closed state when de-energized. The high-pressure fuel is sent to the injector 20 from the common rail 12. In the present embodiment, the fuel pressure sensor 20a (also refer to FIG. 1) is provided to a fuel inlet of the injector 20. Thus, fuel pressure (inlet pressure) at the fuel inlet can be sensed at any time. In more detail, a fuel pressure fluctuation (such as a pulsation pattern) accompanying actual injection or an injection operation of the injector 20, a static fuel pressure level during a non-injection period (i.e., stable pressure) and the like can be sensed (measured) with the output of the fuel pressure sensor 20a.

When the injector 20 performs the fuel injection, an outer valve 202b (a fluid control valve) opens/closes an orifice of 1 (a restrictor) in accordance with an energization state (energization/de-energization) of a solenoid 201b constituting a two-way electromagnetic valve 20b. Thus, a sealed degree of the oil pressure chamber Cd and eventually pressure in the oil pressure chamber Cd (equivalent to back pressure of a needle 20c) are increased/decreased. Due to the increase/decrease in the pressure, the needle 20c reciprocates (moves upward and downward) inside a valve cylinder (i.e., inside a housing 20e) along with or against an extensional force of a spring 20d (a coil spring). Accordingly, a fuel supply passage to injection holes 20f (necessary number of which are bored) is opened/closed in a middle thereof, or in more detail, at a tapered seat face, which the needle 20c is seated on and which the needle 20c is separated from in accordance with the reciprocating movement thereof.

Drive control of the needle 20c is performed through variable control of pulse width. A pulse signal (an energization signal) is sent from the ECU 30 to the drive section (the two-way electromagnetic valve 20b) of the needle 20c. A lift amount of the needle 20c (a separating degree from the seat face) is variably controlled based on the pulse width (equivalent to an energization period). In the control, basically, the lift amount increases as the energization period lengthens, and an injection rate (i.e., a fuel quantity injected per unit time) increases as the lift amount increases. The pressure increase processing of the oil pressure chamber Cd is performed by the fuel supply from the common rail 12. Pressure reduction processing of the oil pressure chamber Cd is performed by returning the fuel in the oil pressure chamber Cd to the fuel tank 10 through the pipe 18 (shown in FIG. 1) connecting the injector 20 and the fuel tank 10.

Thus, the injector 20 has the needle 20c that performs valve opening and valve closing of the injector 20 by opening and closing the fuel supply passage extending to the injection hole 20f through the predetermined reciprocation operation thereof inside the valve body (i.e., the housing 20e). In a non-driven state, the needle 20c is displaced in a valve-closing direction by the force (the extensional force of the spring 20d) constantly applied to the needle 20c in the valve-closing direction. In a driven state, the needle 20c is applied with a driving force, so the needle 20c is displaced in a valve-opening direction against the extensional force of the spring 20d. The lift amount of the needle 20c changes substantially symmetrically between the non-driven state and the driven state.

In the present embodiment, the fuel pressure sensors 20a are provided to the neighborhoods of the respective injectors 20(#1)-20(#4), specifically, to the fuel inlets of the respective injectors 20(#1)-20(#4). A fluctuation mode of the fuel pressure accompanying the actual injection or the injection operation of the injector 20 concerning a predetermined injection can be sensed with high accuracy based on the outputs of the fuel pressure sensors 20a (as mentioned in more detail later).

Figure 3:
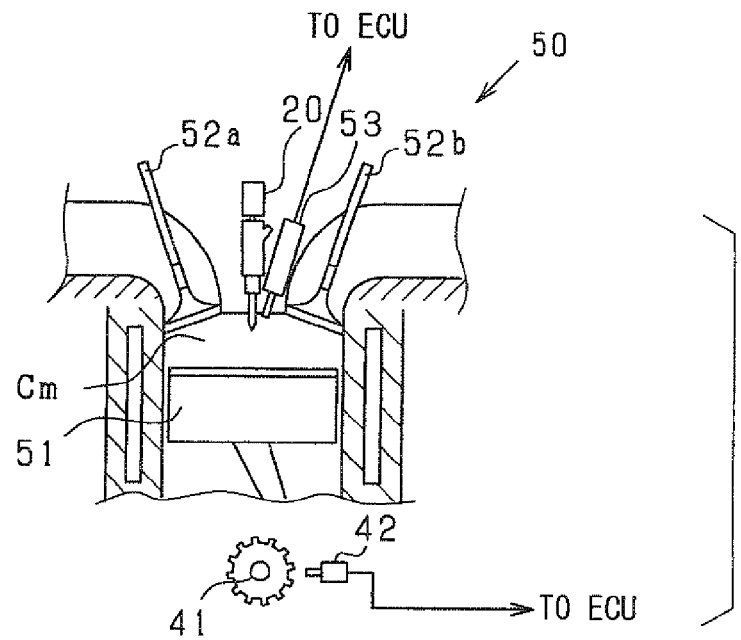
FIG. 3 is a side view showing an internal structure of a cylinder of a diesel engine as a target of the engine control system according to the embodiment.

FIG. 3 is a side view schematically showing an internal structure of one of the four cylinders #1-#4 of the diesel engine as the target of the fuel supply of the present system. The structures of the four cylinders #1-#4 are fundamentally the same. Therefore, an explanation about the internal structure of each cylinder will be given here, paying attention to one cylinder 50 (for example, the cylinder #1).

As shown in FIG. 3, the cylinder 50 accommodates a piston 51 therein. The crankshaft 41 as the output shaft that is common to the respective cylinders #1-#4 and that has a flywheel is provided to the piston 51. The crankshaft 41 rotates in conjunction with reciprocating motion of the piston 51. In the cylinder, a combustion chamber Cm is formed between a top face of the piston 51 and a cylinder head. The injector 20 is provided to the combustion chamber Cm. A cylinder pressure sensor 53 is provided in the combustion chamber Cm, for example, integrally with a glow plug (not shown) as an ignition auxiliary equipment. The cylinder pressure sensor 53 measures pressure in the cylinder 50 (i.e., cylinder pressure) with a sensing section (tip end portion of a probe inserted into the combustion chamber Cm) located in the combustion chamber Cm and outputs a sensing signal (an electrical signal) corresponding to a measurement value. An intake port and an exhaust port are provided in a portion of the cylinder head such that the intake port connects the combustion chamber Cm with an intake pipe and such that the exhaust port connects the combustion chamber Cm with an exhaust pipe. An intake valve 52a and an exhaust valve 52b are provided to the intake port and the exhaust port respectively, in the cylinder 50, each of the intake valve 52a and the exhaust valve 52b is driven by a cam that rotates in conjunction with the crankshaft 41. The cam is attached to a camshaft that rotates once in a period in which the crankshaft 41 rotates twice. Thus, each of the intake valve 52a and the exhaust valve 52b reciprocates at predetermined timing. Accordingly, the intake port and the exhaust port are opened and closed respectively by the valves.

Each cylinder of the target engine has such the structure. During an operation of the engine, an intake air is introduced into the combustion chamber Cm of the cylinder 50 from the intake pipe by an opening operation of the intake valve 52a. The intake air is mixed with the fuel injected and supplied directly from the injector 20 (through direct injection supply) while the intake air is compressed by the piston 51 in the cylinder 50. The mixture of the intake air and the fuel ignites (through self ignition) and combusts. An exhaust gas produced through the combustion is discharged to the exhaust pipe by an opening operation of the exhaust valve 52b. Thus, by causing the pistons of the cylinders to reciprocate in turn with the combustion of the fuel in the combustion chambers Cm, the crankshaft 41 as the output shaft rotates in conjunction with the reciprocation of the pistons 51.

In addition to the above-described sensors, various types of sensors for vehicle control are provided in a vehicle (not shown) such as a four-wheel passenger car or a truck. For example, a crank angle sensor 42 (for example, an electromagnetic pickup) that outputs a crank angle signal at every crank angle (for example, in the cycle of 30° CA) is provided to an outer periphery of the crankshaft 41 as the output shaft of the target engine to sense a rotational angle position of the crankshaft 41, rotation speed of the crankshaft 41 (i.e., engine rotation speed), and the like. An accelerator sensor 44 that outputs an electrical signal corresponding to a state (i.e., a displacement amount) of an accelerator is provided to the accelerator (i.e., an operation section) to sense an operation amount ACCP (i.e., a pressed amount) of the accelerator by the driver.

In such the system, it is the ECU 30 that functions as a fuel injection characteristics sensing device and a fuel injection command correction device according to the present embodiment and that mainly performs the engine control as an electronic control unit. The ECU 30 (engine control ECU) has a well-known microcomputer (not shown). The ECU 30 grasps an operation state of the target engine and requests from the user based on the sensing signals of the above-described various types of sensors and operates the various types of actuators such as the suction control valve 11c and the injectors 20 in accordance with the engine operation state and the requests of the user. Thus, the ECU 30 performs various kinds of control concerning the engine in the optimum modes corresponding to the situation of each time.

Fundamentally, the microcomputer mounted in the ECU 30 consists of various kinds of computing units, storage devices, signal processing devices, communication devices, power supply circuits and the like such as a CPU (basic processing unit) for performing various kinds of computation, a RAM (random access memory) as a main memory for temporarily storing data in the progress of the computation, results of the computation and the like, a ROM (read-only memory) as a program memory, an EEPROM (electrically rewritable nonvolatile memory) as a memory for data storage, a backup RAM (a memory invariably supplied with power from a backup power supply such as an in-vehicle battery even after a main power supply of the ECU 30 is stopped), signal processing devices such as an A/D converter and a clock generation circuit, and input/output ports for inputting/outputting the signals from/to an exterior Various kinds of programs, control maps and the like concerning the engine control including the programs concerning the injection characteristic sensing and the injection command correction are beforehand stored in the ROM. Various kinds of control data including design data of the target engine are beforehand stored in the memory for data storage (for example, the EEPROM).

In the present embodiment, the ECU 30 calculates torque (request torque) that should be generated in the output shaft (the crankshaft 41) at the time and eventually a fuel injection quantity for satisfying the request torque based on the various kinds of the sequentially inputted sensor outputs (sensing signals). Thus, the ECU 30 variably sets the fuel injection quantity of the injector 20 to control indicated torque (generation torque) generated through the fuel combustion in each cylinder (the combustion chamber) and eventual shaft torque (output torque) actually outputted to the output shaft (the crankshaft 41) (that is, the ECU 30 conforms the shaft torque to the request torque). That is, for example, the ECU 30 calculates the fuel injection quantity corresponding to the engine operation state, the operation amount of the accelerator by the driver and the like at each time and outputs an injection control signal (a drive amount) to the injector 20 for directing the fuel injection with the calculated fuel injection quantity in synchronization with desired fuel injection timing. Thus, i.e., based on the drive amount of the injector 20 (for example, a valve opening period), the output torque of the target engine is controlled to a target value.

Figure 4:
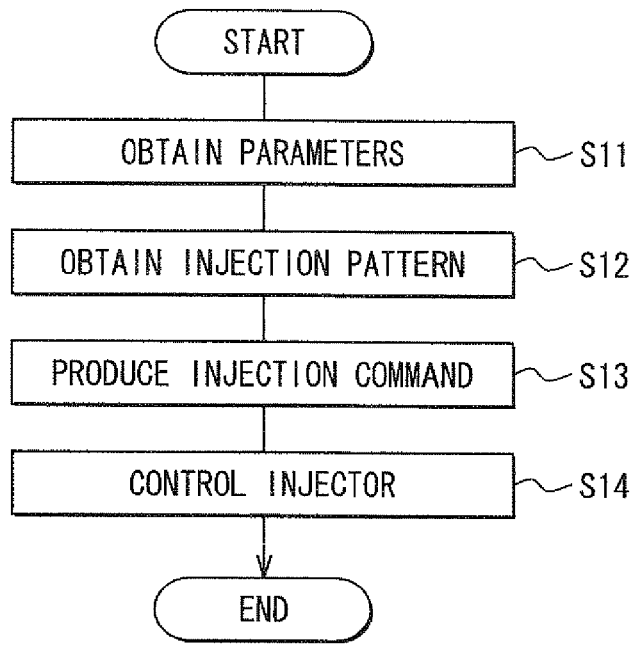
FIG. 4 is a flowchart showing a basic procedure of fuel injection control processing according to the embodiment.

As is well known, in the diesel engine, an intake throttle valve (a throttle) provided in an intake passage of the engine is held at a substantially fully-opened state during a steady operation for the purpose of increase in a fresh air quantity, reduction in a pumping loss and the like. Therefore, control of the fuel injection quantity is a main part of the combustion control during the steady operation (specifically, the combustion control concerning torque adjustment). Hereafter, a fundamental procedure of the fuel injection control according to the present embodiment will be explained with reference to FIG. 4. Values of various parameters used in the processing shown in FIG. 4 are sequentially stored in the storage device mounted in the ECU 30 such as the RAM, the EEPROM or the backup RAM and are updated at any time when necessary. Fundamentally, a series of processing shown in FIG. 4 is serially performed at a frequency of one time per combustion cycle for each cylinder of the target engine through execution of the program stored in the ROM by the ECU 30. That is, with the program, fuel supply to all the cylinders except a dormant cylinder is performed during one combustion cycle.

As shown in FIG. 4, first in S11 (S means "Step") in a series of the processing, predetermined parameters such as the engine rotation speed (i.e., an actual measurement value measured by the crank angle sensor 42) and the fuel pressure (i.e., an actual measurement value measured by the fuel pressure sensor 20a) at the time are read and also the accelerator operation amount ACCP (i.e., an actual measurement value measured by the accelerator sensor 44) by the driver at the time and the like are read. Then, in following S12, an injection pattern is set based on the various parameters read in S11 (and also by separately calculating the request torque including losses due to external loads and the like when necessary).

The injection pattern is obtained based on a predetermined reference map (an injection control map or a mathematical expression) and a correction coefficient stored in the ROM, for example. In more detail, the optimum injection pattern (an adaptation value) is beforehand obtained by experiments and the like in anticipated ranges of the predetermined parameters (read in S11) and is written in the map, for example. For example, the injection pattern is defined by parameters such as the number of injection stages (i.e., the time number of injections performed in one combustion cycle), fuel injection timing of each injection (i.e., injection timing) and an injection period (equivalent to an injection quantity). Moreover, in the present embodiment, a reference diagram indicating a diagram to be created as a profile of a transition of an injection rate is also included in the parameters of the injection pattern. The reference diagram serves as a parameter that shows characteristics of each injection. In the present embodiment, a trapezoid defined by an area and injection start timing is used as the reference diagram, for example. The area of the reference diagram, i.e., the area of the trapezoid, corresponds to the fuel injection quantity (the injection quantity concerning the injection). For example, in the case of a single injection, the area of the trapezoid (i.e., the fuel injection quantity) of the injection is variably set in accordance with the torque that should be generated in the output shaft (the crankshaft 41) (i.e., the request torque equivalent to the engine load at the time). In the case of an injection pattern of the multiple injection (multi-step injection), a total area of the trapezoids (i.e., a total injection quantity) of injections contributing to torque is variably set in accordance with the torque that should be generated in the output shaft (the crankshaft 41).

The above-described map indicates the relationship between parameters and the optimum injection pattern. The injection pattern obtained based on the map is corrected with a correction coefficient (stored in the EEPROM in the ECU 30, for example) that is separately updated (in a manner explained in more detail later). For example, a set value is calculated by dividing the map value by the correction coefficient. Thus, the injection pattern of the injection to be performed at the time is obtained. When the injection pattern is set (in S12), maps set individually for the respective elements of the injection pattern (such as the number of the injection stages) may be used. Alternatively, maps, each of which is made for some collective elements of the injection pattern, or a map for all the elements of the injection pattern may be used.

In following S13, a command signal for the injector 20 is produced based on the injection pattern set in this way.

Figure 5:
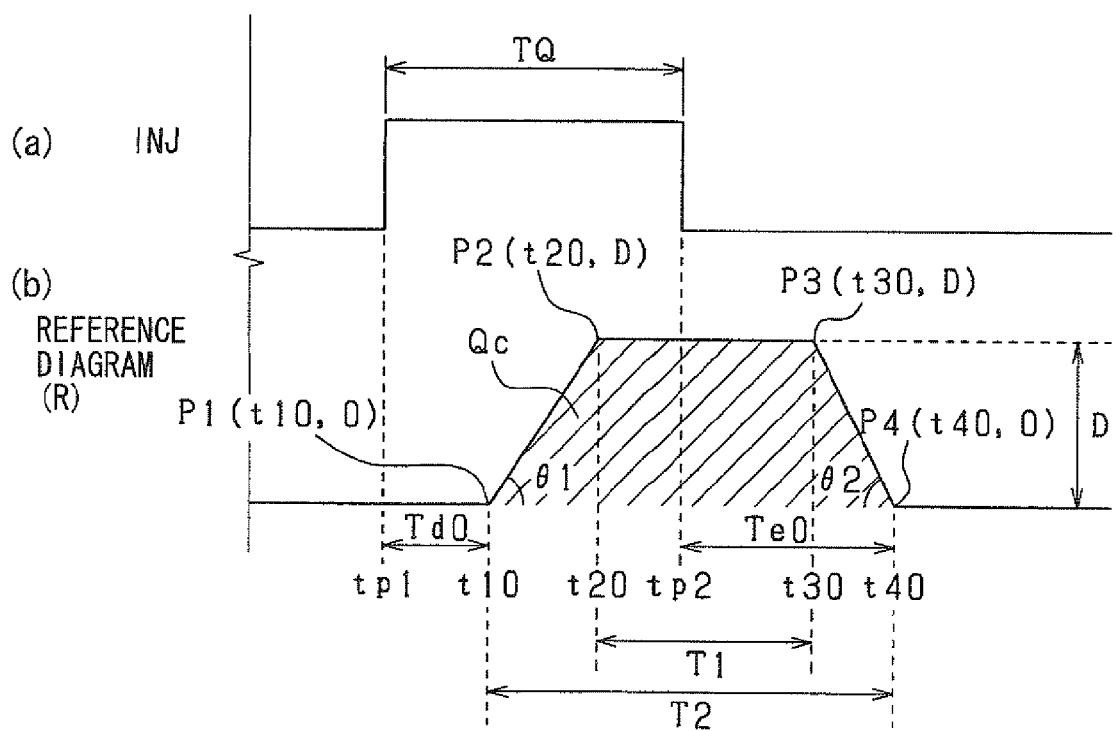
FIG. 5 is a time chart showing a production mode of a command signal to the injector according to the embodiment.

A production mode of the command signal concerning the injection is shown in FIG. 5 as a time chart. In FIG. 5, part (a) shows the command signal INJ and part (b) shows the reference diagram respectively.

As shown in part (b) of FIG. 5, in the present embodiment, the reference diagram is set as a trapezoid having an area Qc.

Timings and injection rates R at four corners of the trapezoid are indicated by timings t10, t20, t30, t40 of four corners P1-P4 and height D of the trapezoid as shown in part (b) of FIG. 5. The area Qc of the trapezoid equivalent to the fuel injection quantity can be expressed by an expression: Qc=½× D×(T1+T2). In the expression, T1 represents a period from the second corner P2 to the third corner P3 (i.e., a period from t20 to t30) equivalent to an upper base of the trapezoid. T2 is a period from the first corner P1 to the fourth corner P4 (i.e., a period from t10 to t40) equivalent to a lower base of the trapezoid. In the present embodiment, the height D of the trapezoid, a rising angle θ1 of the first corner P1 and a return angle θ2 of the fourth corner P4 are set at constant values (fixed values) irrespective of contents of the parameters obtained in S11.

In S13, a command signal (a pulse signal) for the injector 20 is produced so that the diagram as the actual profile of a transition of the injection rate R becomes the above-described trapezoid. That is, rising timing tp1 of the pulse signal is set at timing earlier than the rising timing of the first corner P1 by a delay Td0. The pulse width TQ is calculated based on a relational expression: TQ=T2+Td0−Te0. In the expression, Te0 represents a delay from failing timing tp2 of the pulse signal to the return timing t40 of the fourth corner P4, at which the injection actually ends.

The command value (for example, shown in part (a) of FIG. 5) corresponding to the thus produced injection pattern is used in following S14. That is, in S14, the drive of the injector 20 is controlled based on the command value (the command signal), or in more detail, by outputting the command signal to the injector 20. Thus, a pilot injection, a pre-injection, an after injection, a post-injection and the like are suitably performed with a main injection in accordance with the situation of the vehicle and the like. After the drive control of the injector 20, the series of the processing shown in FIG. 4 is ended.

In the present embodiment, the diagram (including various parameters of the diagram) as the profile of the transition of the injection rate R of the target injector 20 at the time is detected based on the output of the fuel pressure sensor 20a. Then, based on the detected diagram and the basic diagram (S12 of FIG. 4) mentioned above, the injection command to the injector 20 is varied such that the diagram as the actual profile of the transition of the injection rate R becomes a diagram that belongs to the basic diagram and that has the same area as the basic diagram. More specifically, a correction coefficient for the reference map (S12 of FIG. 4), in which the injection command used when performing the injection control with the injector 20 is written, is sequentially updated. More specifically, coefficients concerning the above-described basic diagram out of the multiple kinds of coefficients are sequentially updated. Thus, the injection command to the injector 20 is variably set.

Next, a mode in the case of detecting each timing concerning the above-described fuel injection (i.e., the injection timing) based on the output of the fuel pressure sensor 20a will be explained in detail with reference to FIGS. 6 to 16.

Figure 6:
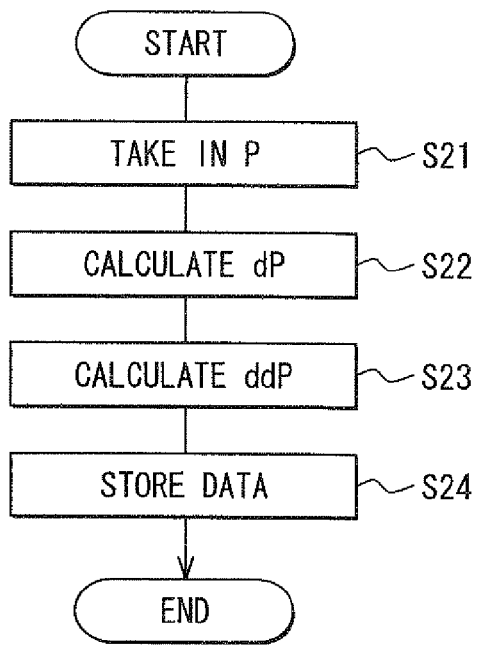
FIG. 6 is a flowchart showing a series of processing concerning data acquisition (learning processing) and differential value calculation according to the embodiment.

In the detection of the injection timing, the output of the fuel pressure sensor 20a is taken in first, and then, a first order differential value dP and a second order differential value ddP of the fuel pressure P at each timing are calculated from the output. FIG. 6 is a flowchart showing a series of processing concerning the data acquisition (obtainment and storage of the sensor output: learning processing) and differential value calculation. Fundamentally, a series of processing shown in FIG. 6 is serially performed at a predetermined processing interval (e.g., at an interval of 20 μsec) through execution of a program stored in the ROM by the ECU 30. Values of various parameters used in the processing shown in FIG. 6 are serially stored in the storage device mounted in the ECU 30 such as the RAM, the EEPROM or the backup RAM and are updated at any time when necessary.

As shown in FIG. 6, in a series of the processing, the output of the fuel pressure sensor 20a is taken in first in S21. In following S22, a pressure first order differential value dP is calculated as a difference between a present value and a previous value of the pressure value P (i.e., dP=P(present)−P(previous)). In following S23, a pressure second order differential value ddP is calculated as a difference between a present value and a previous value of the first order differential value dP (i.e., ddP=dP(present)−dP(previous)). Then, in following S24, the respective data P, dP, ddP are stored and the series of the processing is ended.

Figure 7:
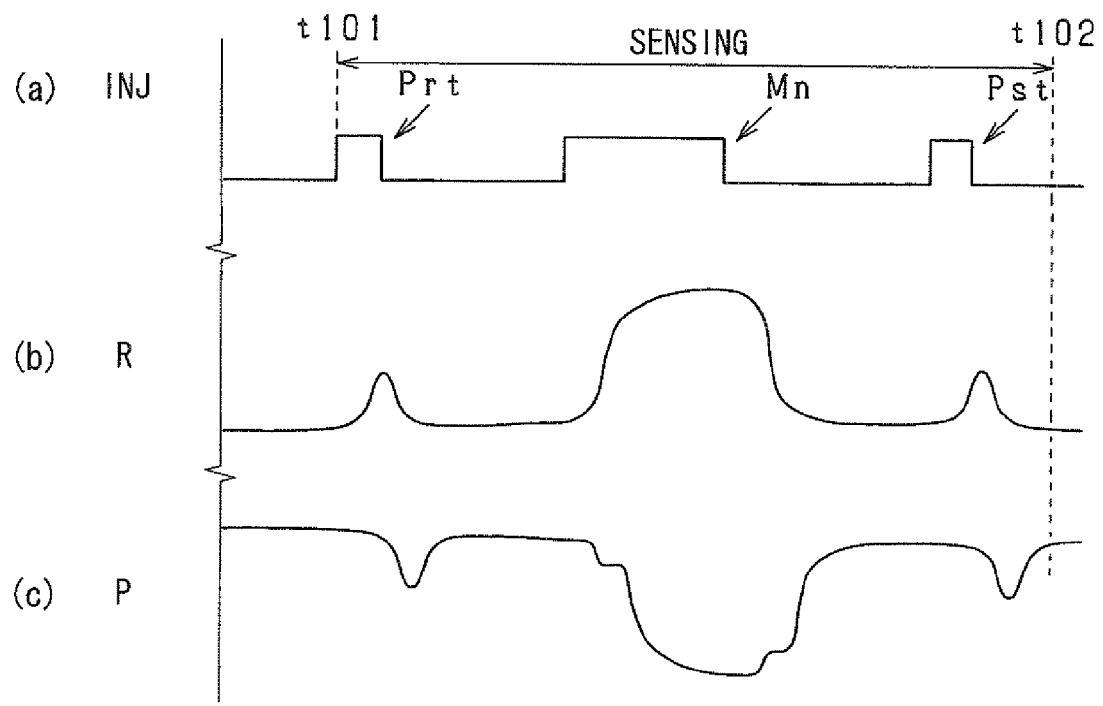
FIG. 7 is a time chart showing a setting mode of an execution period of the learning processing according to the embodiment.
Figure 8:
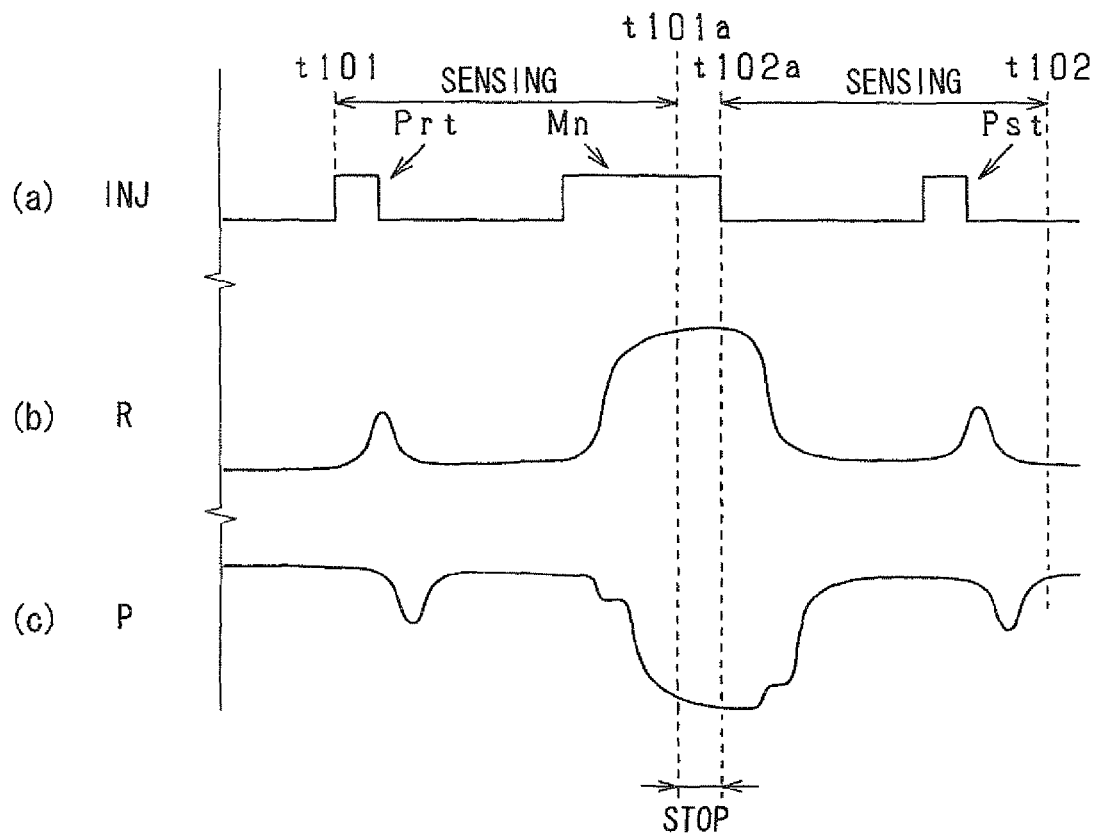
FIG. 8 is a time chart showing another setting mode of an execution period of the learning processing according to the embodiment.

Next, an execution period and a setting mode of the processing shown in FIG. 6 will be explained with reference to FIGS. 7 and 8. In FIG. 7 or 8, part (a) is a time chart showing a transition of the injection command signal INJ (the pulse signal) to the injector 20, part (b) is a time chart showing a transition of the injection rate R (i.e., the fuel quantity injected per unit time), and (c) is a time chart showing a transition of the fuel pressure P (i.e., the inlet pressure) sensed with the above-described fuel pressure sensor 20a (shown in FIG. 1).

As shown in FIG. 7, in the present embodiment, multiple injections (for example, three-stage injections of a pilot injection Prt, a main injection Mn and a post-injection Pst shown in FIG. 7) are performed by the injector 20 during a combustion cycle of the engine in some cases. When a sensor output acquisition period is set, start timing of the sensor output acquisition period (i.e., a sensing period: a period indicated by "SENSING" in FIG. 7) is set to injection start command timing (timing t101) of the injector 20, which is directed by an injection start command concerning the earliest injection in the combustion cycle (for example, the pilot injection Prt shown in FIG. 7). The energization is started at the injection start command timing t101 of the injector 20. Furthermore, end timing (timing t102) of the above-described sensing period is set based on a pressure fluctuation mode after execution of the latest injection in the same combustion cycle (for example, the post-injection Pst shown in FIG. 7). In more detail, the end timing (timing t102) of the sensing period is set to timing (equivalent to injection end timing) when the pressure fluctuation caused by the post-injection Pst converges. Thus, the above-described sensing period is set at least to the period from the start of the pressure fluctuation due to the pilot injection Prt to the end of the pressure fluctuation due to the post-injection Pst in a limited way. That is, the sensing period is set to a predetermined period (from the timing t101 to the timing t102) including a period (a pressure fluctuation period), in which the pressure fluctuation is caused by the actual injection of the injector 20, in a limited way.

Fundamentally, desired data (a waveform of the pressure fluctuation related to the injection) can be obtained even during such the limited period. It is because the excluded period due to the limitation of the sensing period is a period that is not a sensing target, i.e., a period in which only unnecessary data can be obtained (sensed) normally. Since the sensing period is set as the short and limited period, a processing load of the ECU 30 can be reduced and a used storage area of the RAM can be reduced.

Moreover, in the present embodiment, a period (a stoppage period from t101a to t102a indicated by "STOP" in FIG. 8) for temporarily suspending the acquisition of the sensor output is set at least in a part of a period (a pressure stabilization period) in which the fuel pressure at the installation position of the fuel pressure sensor 20a is stable in the period (the sensing period) set in the above-mentioned mode for sequentially acquiring the output of the fuel pressure sensor 20a as shown in FIG. 8. In more detail, if a lift amount of the needle 20c of the injector 20 (shown in FIG. 2) becomes sufficiently large to the extent that sufficient high-pressure fuel is supplied to the injection hole 20f (shown in FIG. 2), the injection rate R converges to a substantially constant value at an injection limit due to a bore diameter of the injection hole 20f (i.e., a fuel outlet area). Therefore, in such the period, with the stabilization of the injection rate R, the pressure P sensed with the fuel pressure sensor 20a, i.e., the fuel pressure in the fuel passage where the sensor 20a is installed, is also stabilized. In the present embodiment, start timing (timing t101a) of such the pressure stabilization period is sensed based on the sensor output (a pressure fluctuation mode) of the sensor 20a at each time. The start timing of the stoppage period is set at the start timing t101a of the sensed pressure stabilization period. More strictly, the start timing of the stoppage period is set at timing where the start timing of the pressure stabilization period is decided. Furthermore, end timing of the stoppage period is set at the injection end command timing (i.e., the timing t102a) directed by the injection end command to the injector 20.

Thus, in the present embodiment, the above-described sensing period is further limited by providing the stoppage period t101a-t102a. Fundamentally, desired data (a waveform of the pressure fluctuation related to the injection) can be obtained even during such the limited sensing periods t101-t101a, t102a-t102. It is because the period excluded by the above-described limitation of the sensing period is a period in which the fuel pressure P is stable and the fuel pressure P in such the excluded period can be fundamentally estimated by interpolation calculation and the like based on the pressure values before and after the stoppage period t101a-t102a. Since the sensing period is set as the further short and limited period, a processing load of the ECU 30 can be reduced further and a used storage area of the RAM can be reduced further.

Figure 9:
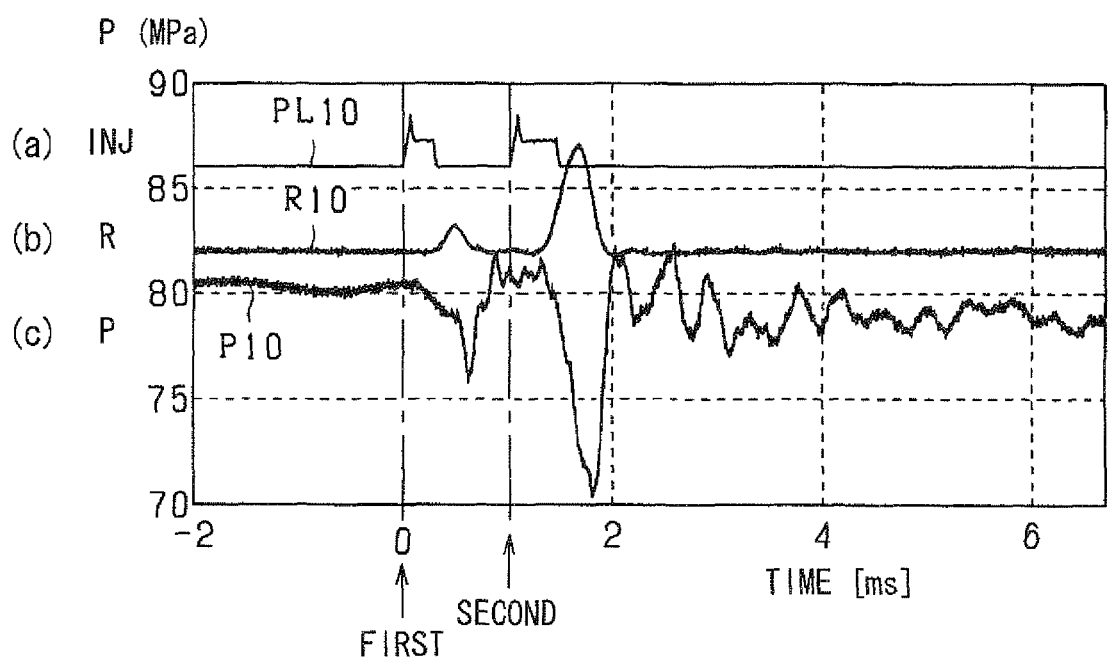
FIG. 9 is a time chart showing transitions of injection parameters according to the embodiment.

FIG. 9 is a time chart showing an example of the pressure transition waveform obtained in S21 of FIG. 6. In FIG. 9, a solid line PL10 in part (a) indicates a transition of the injection command signal INJ (the pulse signal) to the injector 20, a solid line R10 in part (b) indicates a transition of the injection rate R (the fuel quantity injected per unit time), and a solid line P10 in part (c) indicates a transition of the fuel pressure P (the inlet pressure) sensed with the above-described fuel pressure sensor 20a. FIRST in FIG. 9 indicates a first stage injection and SECOND is a second stage injection.

As shown in FIG. 9, the sensor output acquired in S21 of FIG. 6 contains a high-frequency noise. In the present embodiment, filtering processing is applied to the sensor output by letting the sensor output pass through a filter. A band pass filter may be used as the filter. Then, in following S22 and S23, first order differential processing and second order differential processing are applied to the filtered data (the data from which the high-frequency noise is removed). Thus, the above-mentioned differential data are derived (calculated). Thus, the change in the fuel pressure P accompanying the change in the actual injection state or the injection operation state can be sensed with higher accuracy.

Figure 10:
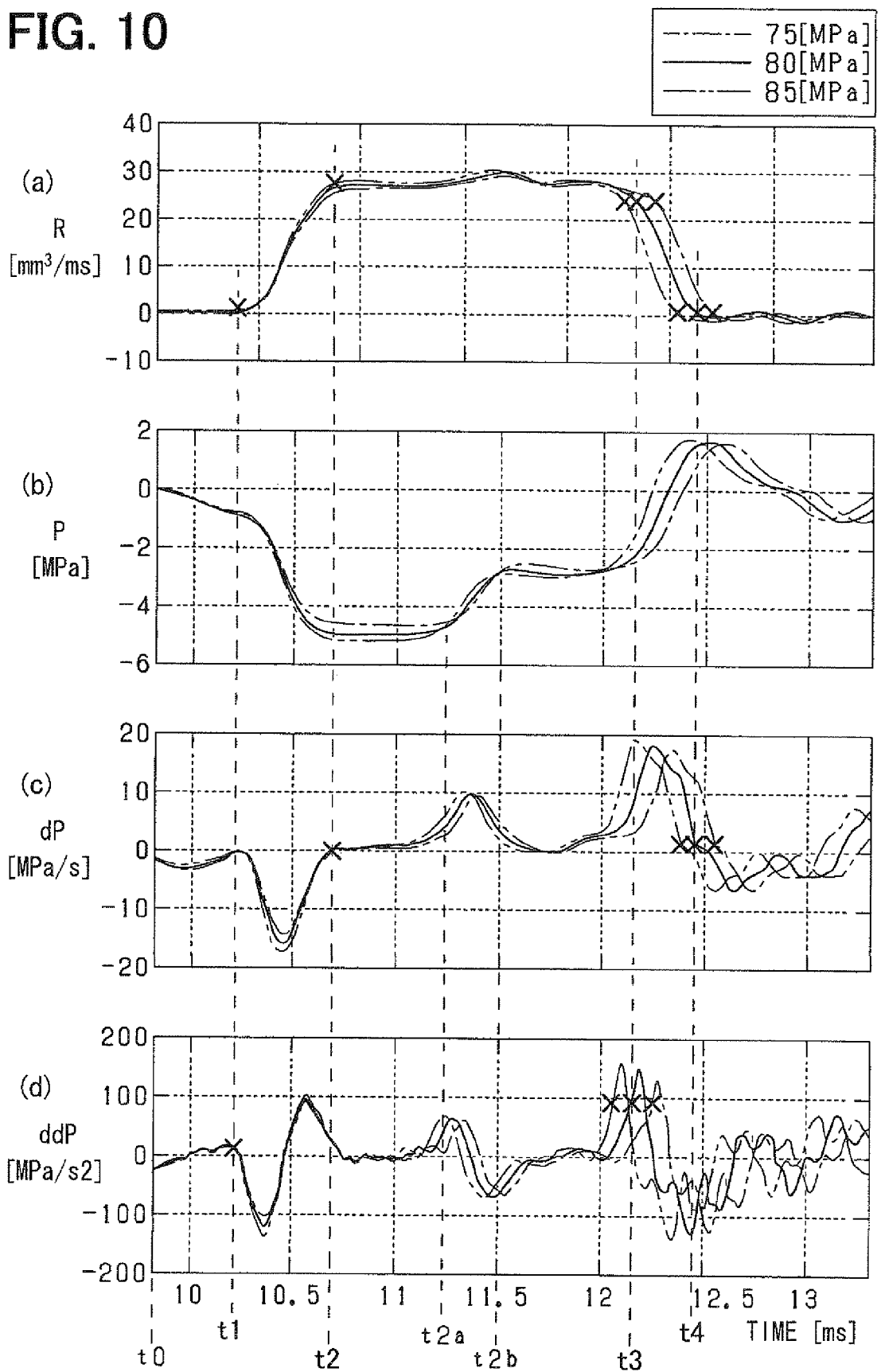
FIG. 10 is a time chart showing transitions of injection parameters according to the embodiment.

FIG. 10 is a time chart showing an example of pressure transition waveforms acquired and stored (i.e., learned) through the processing shown in FIG. 6. In FIG. 10, part (a) is a time chart showing a transition of the injection rate R (i.e., the fuel quantity injected per unit time), part (b) is a time chart showing waveform data after the above-described filtering processing is applied to the sensor output, part (c) is a time chart showing waveform data after the first order differential processing is applied to the data having undergone the filtering processing, and part (d) is a time chart showing waveform data after the second order differential processing is applied to the data having undergone the filtering processing. In FIG. 10, chained lines show data of a fuel pressure level (fuel pressure immediately before injection) of 75 MPa, solid lines show data of a fuel pressure level of 80 MPa, and chain double-dashed lines show data of a fuel pressure level of 85 MPa, respectively.

As shown in part (b) of FIG. 10, the pressure transition after rising timing of the injection command pulse to the injector 20 (i.e., the energization start timing) (equivalent to timing before timing t0) indicates a following tendency as a general tendency. That is, there is a short period in which the pressure P is constant first, and after the period, the pressure P starts to gradually decrease at the timing to shown in part (b) of FIG. 10. Then, the pressure P starts to decrease steeply at timing t1. The initial period in which the pressure P is constant and the following period t0-t1 in which the pressure P gradually decreases correspond to an invalid injection time (an invalid injection period) of the injector 20.

In more detail, the invalid injection time is a summation of various kinds of delays such as a delay since the energization (rising of the injection command pulse) occurs until a normal magnetic field is formed by the solenoid 201b (shown in FIG. 2) and an operation delay due to an inertia of the outer valve 202b, the needle 20c and the like (shown in FIG. 2), an inertia of the fuel, a friction with a wall surface inside the nozzle, and the like. The invalid injection time is equivalent to a time since the drive (the energization) of the injector 20 is started until the fuel is actually injected.

The pressure P decreases gradually in a period after the period in which the pressure P is constant in the invalid injection period. This shows that pressure leak is caused by the injection operation of the injector 20. More specifically, this phenomenon occurs because the injector 20 is an injector of a type that is accompanied by pressure leak during a period since the injector starts an operation concerning the injection (i.e., an opening operation of the outer valve 202b) until the injection is actually started. More specifically, as mentioned above, the injector 20 returns the fuel in the oil pressure chamber Cd to the fuel tank 10 by opening the orifice of 1 to drive the needle 20c when the injector 20 is energized (ON). Therefore, the fuel pressure due to the common rail 12 leaks through the orifice of 1 (shown in FIG. 2) during the injection operation of the injector 20. That is, the pressure drop at the time (i.e., the pressure drop in the period from t0 to t1) corresponds to the gentle decrease of the pressure P (i.e., the pressure leak) in the above-described invalid injection period.

As contrasted thereto, a pressure drop point (i.e., the timing t1) when the pressure P starts to fall steeply corresponds to the timing when the injection is actually started through the injector 20 (i.e., the injection start timing).

As shown in FIG. 10, the pressure transition (the pressure transition waveform) after the above-described injection start timing (the timing t1) has a following tendency as a general tendency. That is, a transition is made from the steep pressure drop at the timing t1 to a pressure local minimum point at timing t2 and a stable period of the pressure value at the pressure minimum point, and then, a transition is made to pressure increase at timing t2a. After that, the pressure P is stabilized once at timing t2b but rises steeply at timing t3 again. If the pressure P eventually reaches a level near a pressure value before the injection (i.e., a zero crossing point) at timing t4, the pressure P surges (pulsates) near the pressure value.

The timing t2 corresponds to timing when the injection rate R is maximized (hereinafter, referred to as a maximum injection rate reaching timing). The timing t2a corresponds to timing when the outer valve 202b closes. The timing t3 corresponds to timing when the injection rate R starts to decrease after reaching the maximum injection rate (hereinafter, referred to as injection rate decrease start timing). The timing t4 corresponds to timing when the injection by the injector 20 stops, i.e., the injection end timing. Like the invalid injection time in the injection start, there occurs a delay from the de-energization (i.e., falling of the injection command pulse) to the injection end timing (timing t4) also in the injection end of the injector 20.

Next, processing for detecting the respective timings (timings t1-t4) concerning the above-described fuel injection will be explained in detail with reference to FIGS. 10 to 16 based on the pressure transition waveforms shown in parts (b) to (d) of FIG. 10, i.e., the pressure transition waveforms acquired and stored (i.e., learned) thought the processing of FIG. 6. FIGS. 11 and 13 to 15 are flowcharts showing a series of processing concerning the detection of the respective timings. Fundamentally, a series of processing shown in the drawings is serially performed at a predetermined interval (e.g., at an interval of 20 μsec) through execution of programs stored in the ROM by the ECU 30. Through the execution of the processing, the detection and the storage of the above-described timings are performed once per injection. That is, in the case of a single-stage injection, a set of the detection and storage is performed once per combustion cycle. In the case of a two-stage injection, a set of the detection and storage is performed twice per combustion cycle. Values of various parameters used in the processing shown in the respective drawings are serially stored in the storage device mounted in the ECU 30 such as the RAM, the EEPROM or the backup RAM and are updated at any time when necessary like the processing shown in FIG. 6.

Figure 11:
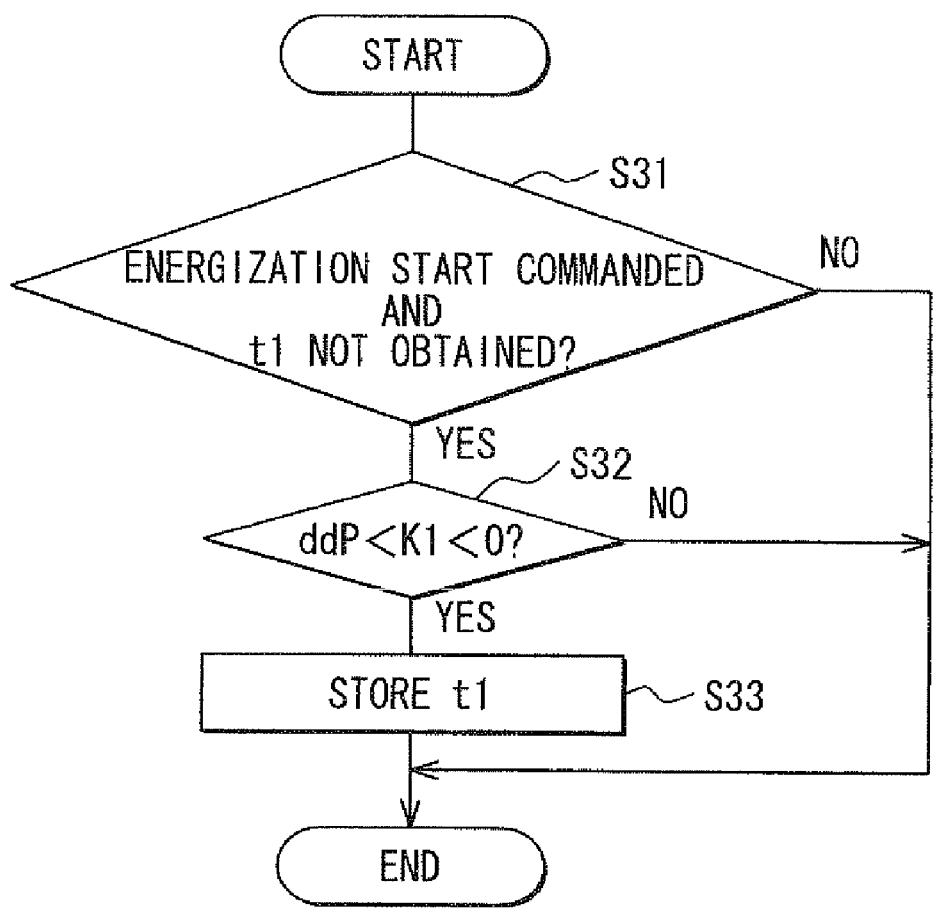
FIG. 11 is a flowchart showing a series of processing for detecting injection start timing according to the embodiment.

Processing shown in FIG. 11 is for detecting the above-described injection start timing (the timing t1).

As shown in FIG. 11, in a series of the processing, first in S31, it is determined whether the injection start command (the energization start) of a certain injection has been made and the timing t1 has not been detected yet. Only when it is determined that the injection start command of the certain injection has been made and the timing t1 has not been detected yet in S31, processing from S32 is performed. That is, a period in which the condition of S31 is satisfied corresponds to a sensing period of the above-described timing t1.

In S32, it is determined whether the pressure second order differential value ddP calculated in S23 of FIG. 6 is smaller than a predetermined threshold value K1 (ddP<K1).

The threshold value K1 is set at a value smaller than 0 (K<0), i.e., at a negative value. When the value K1 is set, the value K1 is variably set based on multiple maps obtained through experiments and the like beforehand, e.g., maps shown in FIGS. 12A to 12C. This responds to the fact that the inclination of the pressure drop (shown in FIG. 10) accompanying the above-mentioned injection start changes in accordance with the fuel pressure P immediately before the injection (i.e., the fuel pressure level at the time of the stability before the timing t0 of FIG. 10), the injection execution timing, the cylinder pressure and the like. That is, the threshold value K1 is set at the smaller value (i.e., at a larger value on the negative side) as the inclination of the pressure drop becomes steeper.

Figure 12A:
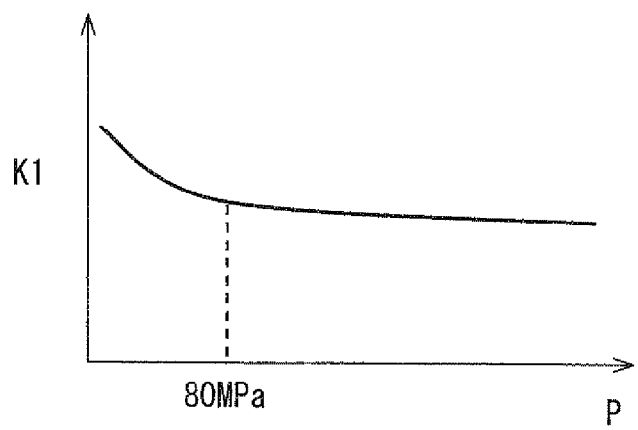
FIGS. 12A to 12C are maps used for variably setting a threshold value used for sensing the injection start timing according to the embodiment.

FIG. 12A is a map showing a relationship between the fuel pressure level P (i.e., the actual measurement value measured by the fuel pressure sensor 20a) and an adaptation value (i.e., the optimum value) of the threshold value K1 obtained by experiment and the like. As shown in FIG. 12A, according to the map, the threshold value K1 is set at the smaller value as the fuel pressure level P increases before the fuel pressure level P reaches a convergence point (80 MPa, in this example). If the fuel pressure level P reaches the convergence point, a degree of the decrease in the threshold value K1 with respect to the increase in the fuel pressure level P becomes very small.

Figure 12B:
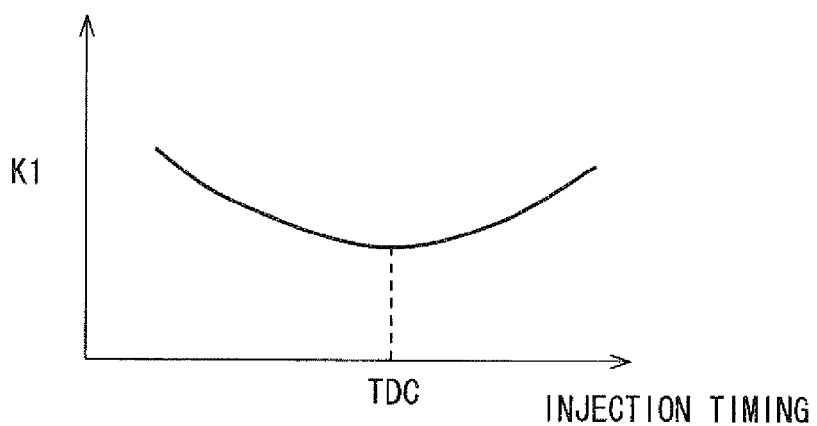

FIG. 12B is a map showing a relationship between the injection execution timing and the adaptation value (i.e., the optimum value) of the threshold value K1 obtained through experiment and the like. The injection execution timing is detected as the injection start command timing directed by the injection start command to the injector 20, or in more detail, as the rising timing of the injection command pulse (i.e., the energization start timing). As shown in FIG. 12B, according to the map, the threshold value K1 is set at the smaller value as the injection execution timing comes closer to TDC (a top dead center).

Figure 12C:
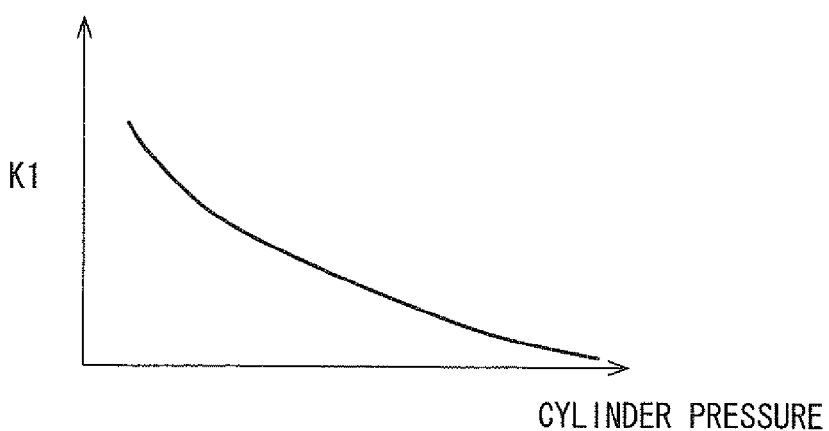

FIG. 12C is a map showing a relationship between the pressure inside the cylinder of the target engine (i.e., the actual measurement value measured by the cylinder pressure sensor 53 shown in FIG. 3) and the adaptation value (the optimum value) of the threshold value K1 obtained through experiment and the like. As shown in FIG. 12C, according to the map, the threshold value K1 is set at the smaller value as the cylinder pressure increases.

Thus, in the present embodiment, the threshold value K1 is variably set in accordance with the inclination of the pressure drop. Accordingly, the above-described pressure drop accompanying the injection and eventually the injection start timing (the timing t1 shown in FIG. 10) can be detected with high accuracy.

The processing of S32 is repeatedly performed in the sensing period of the timing t1. The series of the processing of FIG. 11 is ended if it is determined that the pressure second order differential value ddP is not smaller than the threshold value K1 in S32. If it is determined that the pressure second order differential value ddP is smaller than the threshold value K1, the present timing is stored as the injection start timing (the timing t1) in a predetermined storage device in following S33. The fuel pressure P at the timing t1 (corresponding to a reference point of the injection rate R (=0)) is also stored in the same storage device. In this case, it is effective to store the timing and the fuel pressure P in a predetermined storage device (for example, the EEPROM or the backup RAM) capable of holding the data even after the stoppage of the main power supply to the ECU 30, while relating the data to a predetermined parameter (for example, an engine state as of the data acquisition) if needed. Thus, the data is held in the storage device in a non-volatile manner without being erased even after the target engine is stopped and the power supply to the ECU 30 is blocked out. As a result, preservation of the data and eventually read-out of the data over a long period of time are enabled. If the data is related to the predetermined parameter when the data is stored, the data retrieval is facilitated by using the parameter when the data is read. Thus, data analysis and the like can be performed easily and appropriately.

Thus, in the present embodiment, the timing when the pressure drop accompanying the injection start occurs or eventually the injection start timing (the timing t1 of FIG. 10) is detected as the timing (a cross point), at which the pressure second order differential value ddP shifts from the larger side than the threshold value K1 to the smaller side than the threshold value K1. With such the detection scheme, the above-described pressure drop can be grasped accurately, and eventually the injection start timing can be detected accurately.

Figure 13:
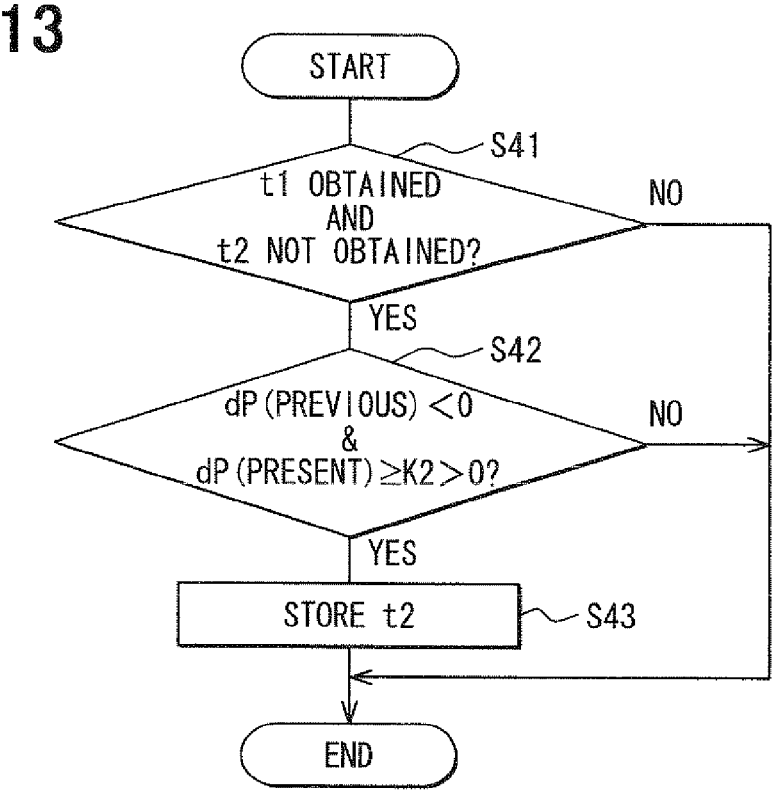
FIG. 13 is a flowchart showing a series of processing for detecting maximum injection rate reaching timing according to the embodiment.

Processing shown in FIG. 13 is for detecting the above-described maximum injection rate reaching timing (i.e., the timing t2).

As shown in FIG. 13, in a series of the processing, first in S41, it is determined whether the timing t1 of the aforementioned injection has been detected and the timing t2 of the injection has not been detected yet. Only when it is determined that the timing t1 of the injection has been detected and the timing t2 of the injection has not been detected yet in S41, processing from S42 is performed. That is, a period in which the condition of S41 is satisfied corresponds to a sensing period of the above-described timing t2.

In S42, it is determined whether the previous value of the pressure first order differential value dP calculated in S 22 of FIG. 6 is smaller than 0 (i.e., dP(previous)<0) and the present value of the pressure first order differential value dP is equal to or greater than a predetermined threshold value K2 (i.e., dP(present)≧K2). The threshold value K2 may be a fixed value or a variable value. The threshold value K2 is set at a value greater than 0, i.e., a positive value (k2>0).

The processing of S42 is repeatedly performed in the sensing period of the timing t2. If it is not determined in S42 that dP(previous)<0 and dP(present)≧K2, the series of the processing of FIG. 13 is ended. If it is determined in S42 that dP(previous)<0 and dP(present)≧K2, the present timing is stored as the maximum injection rate reaching timing (the timing t2 shown in FIG. 10) in a predetermined storage device (for example, the EEPROM, the backup RAM or the like) in following S43. The fuel pressure P at the timing t2 is also stored in the same storage device. A decrease amount of the fuel pressure P from the timing t1 corresponds to the injection rate R at the timing t2.

Thus, in the present embodiment, the timing when the fuel pressure P is stabilized after the end of the steep decrease of the fuel pressure P caused at the injection start or eventually the maximum injection rate reaching timing (the timing t2 shown in FIG. 10) is detected as the timing (a cross point), at which the pressure first order differential value dP shifts from the smaller side than the threshold value K2 to the larger side than the threshold value K2. With such the detection scheme, the above-described timing when the fuel pressure P stabilizes can be grasped accurately, and eventually the maximum injection rate reaching timing can be detected accurately Processing shown in FIG. 14 is for detecting the above-described injection end timing (timing t4).

Figure 14:
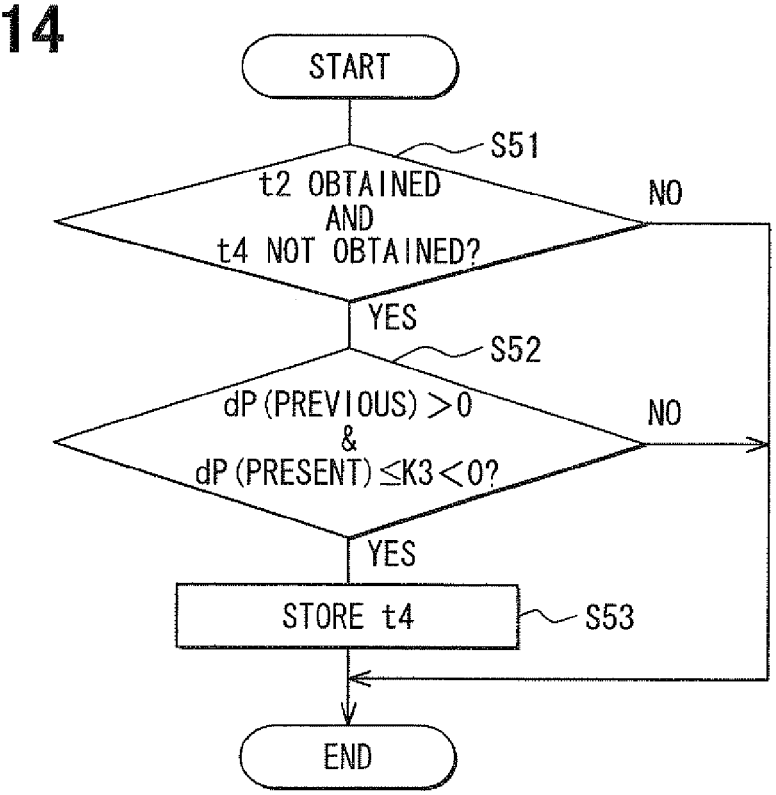
FIG. 14 is a flowchart showing a series of processing for detecting injection end timing according to the embodiment.

As shown in FIG. 14, in a series of the processing, first in S51, it is determined whether the timing t2 of the aforementioned injection has been detected and the timing t4 of the injection has not been detected yet. Only when it is determined that the timing t2 of the injection has been detected and the timing t4 of the injection has not been detected yet in S51, processing from S52 is performed. That is, a period in which the condition of S51 is satisfied corresponds to a sensing period of the above-described timing t4

In S52, it is determined whether a previous value of the pressure first order differential value dP calculated in S22 of FIG. 6 is greater than 0 (dP>0) and a present value of the pressure first order differential value dP is equal to or smaller than a predetermined threshold value K3 (i.e., dP(present) ≦K3). The threshold valve K3 may be a fixed value or a variable value. The threshold value K3 is set at a value smaller than 0, i.e., a negative value (K3<0).

The processing of S52 is repeatedly performed in the sensing period of the timing t4. If it is not determined in S52 that dP(previous)>0 and dP(present)≦K3, the series of the processing of FIG. 14 is ended. If it is determined in S52 that dP(previous)>0 and dP(present)≦K3, the present timing is stored as the injection end timing (the timing t4 shown in FIG. 10) in a predetermined storage device (for example, the EEPROM, the backup RAM or the like) in following S53. The fuel pressure P at the timing t4 is also stored in the same storage device.

Thus, in the present embodiment, the timing when the pulsation of the fuel pressure P starts after the end of the steep increase of the fuel pressure P due to the closing of the injector or eventually the injection end timing (the timing t4 shown in FIG. 10) is detected as the timing (a cross point), at which the pressure first order differential value dP shifts from the larger side than the threshold value K3 to the smaller side than the threshold value K3. With such the detection scheme, the change in the above-described pressure fluctuation mode can be grasped accurately, and eventually the injection end timing can be detected accurately.

Figures 15, 16A, 16B:
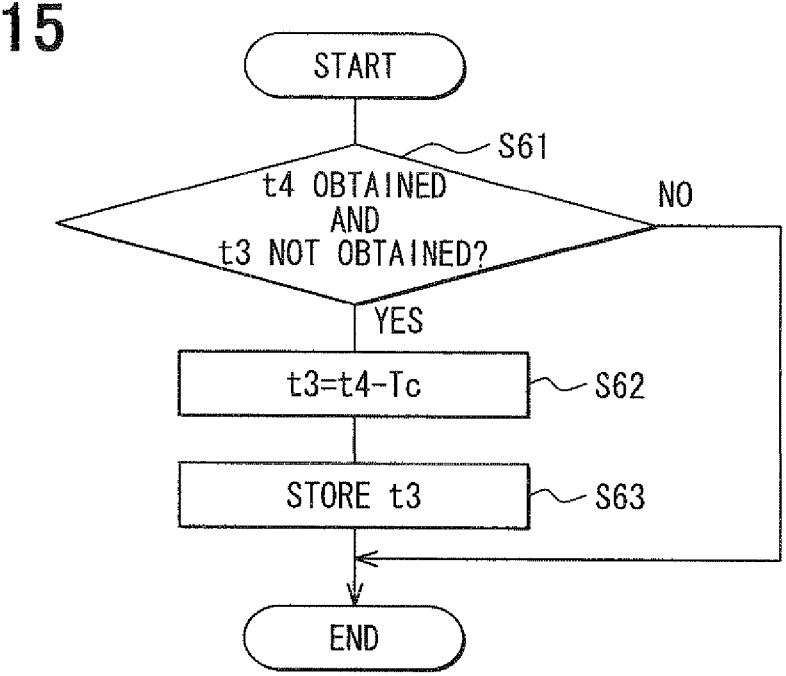
FIG. 15 is a flowchart showing a series of processing for detecting timing at which the injection rate starts decreasing after reaching the maximum injection rate according to the embodiment.
FIGS. 16A and 16B are maps used for variably setting a return time used for detecting the injection rate decrease start timing according to the embodiment.

Processing shown in FIG. 15 is for detecting timing (the timing t3), at which the injection rate R starts to decrease after reaching the above-described maximum injection rate (at the timing t2).

As shown in FIG. 15, in a series of the processing, first in S61, it is determined whether the timing t4 of the aforementioned injection has been detected and the timing t3 of the injection has not been detected yet. Only when it is determined that the timing t4 of the injection has been detected and the timing t3 of the injection has not been detected yet in S61, processing from S62 is performed.

In S62, the timing (i.e., the timing t3 shown in FIG. 10), at which the injection rate R starts to decrease after reaching the maximum injection rate, is detected as timing earlier than the injection end timing (timing t4) by a predetermined return time Tc (t3=t4−Tc). In following S63, the timing t3 is stored in a predetermined storage device (for example, the EEPROM, the backup RAM or the like). The fuel pressure P at the timing t3 is also stored in the same storage device.

The return time Tc is variably set based on multiple maps obtained through experiments and the like beforehand, e.g., maps shown in FIGS. 16A and 16B. This responds to the fact that the period since the injection rate R starts to decrease until the injection ends changes in accordance with the fuel pressure P immediately before the injection (i.e., the fuel pressure level at the time when the pressure is stable ) and the injection period.

FIG. 16A is a map showing a relationship between the fuel pressure level P (i.e., the actual measurement value measured by the fuel pressure sensor 20a) and an adaptation value (i.e., the optimum value) of the return time Tc obtained through the experiment and the like. As shown in FIG. 16A, according to the map, the return time Tc is set at a shorter time as the fuel pressure level P (i.e., base pressure) increases.

FIG. 16B is a map showing a relationship between the injection period (which is detected as pulse width TQ of the injection command, for example) and an adaptation value (i.e., the optimum value) of the return time Tc obtained through the experiment and the like. As shown in FIG. 16B, according to the map, the return time Tc is set at a longer time as the injection period lengthens.

Thus, in the present embodiment, the timing (the timing t3 shown in FIG. 10) at which the injection rate R starts decreasing after reaching the above-described maximum injection rate is detected based on a relative positional relationship between the timing t3 and the timing t4 detected through the processing shown in FIG. 14. With such the detection scheme, the timing t3 shown in FIG. 10 can be detected easily and accurately.

As described above, in the present embodiment, the injection start timing, the maximum injection rate reaching timing, the timing at which the injection rate R starts decreasing after reaching the maximum injection rate, and the injection end timing are sequentially detected for each injection (each of the multiple injections performed during a combustion cycle in the case of the multiple injection) respectively through the processing shown in FIGS. 6, 11, and 13 to 15 based on the output of the above-described fuel pressure sensor 20a. Based on the timings, or more specifically, by producing a diagram by connecting the points of the respective timings, a diagram (a trapezoid) as a profile of the injection rate transition of the target injector 20 at the time and parameters of the diagram (an area of the trapezoid, timings of corners of the trapezoid, an injection rate and the like) are sensed.

Then, correction coefficients for the reference map (S12 of FIG. 4) (more specifically, coefficients concerning the above-described basic diagram out of the multiple kinds of coefficients) are sequentially updated based on the detected diagram (the sensed diagram) and the above-mentioned basic diagram (S12 of FIG. 4) such that the diagram as the actual profile of the injection rate transition becomes a diagram that belongs to the basic diagram and has the same area as the basic diagram. That is, when the detected diagram is a shape such as a triangle or a boot shape other than the trapezoid, the correction coefficients are updated such that the diagram as the profile of the injection rate transition in the subsequent combustion cycle becomes the trapezoid.

FIGS. 17 to 21 show updating modes of the correction coefficients.

Figure 17:
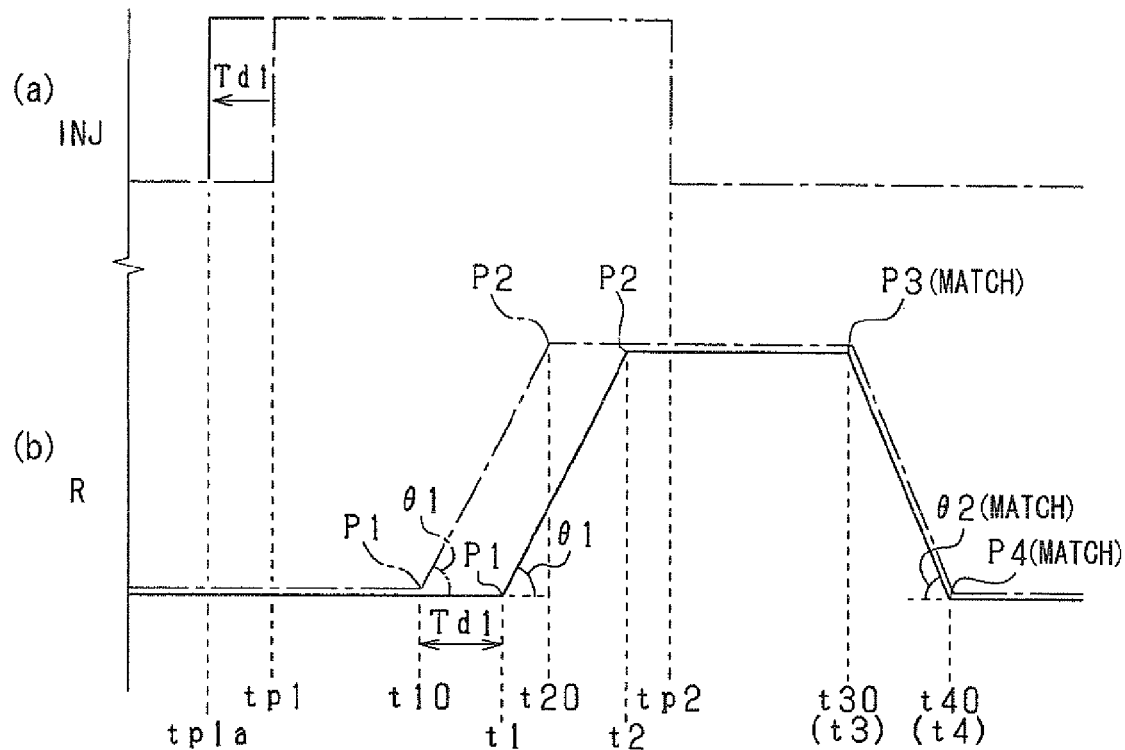
FIG. 17 is a time chart showing an updating mode of a correction coefficient of the command signal to the injector according to the embodiment.

In an example shown in FIG. 17, there occurs a deviation between the rising timings of the first corners P1 (i.e., the injection start timings) of the detected diagram (shown by a solid line) and the basic diagram (shown by a chained line) while rising angles of the first corners P1 are the same angle ($\theta1$). In this example, a deviation amount Td1 is caused between the timing t10 of the first corner P1 of the basic diagram and the timing t1 of the first corner P1 of the detected diagram. The third corner P3 and the fourth corner P4 of the detected diagram match with those of the basic diagram respectively but the first corner P1 and the second corner P2 of the detected diagram are delayed from those of the basic diagram in a direction parallel to the time axis.

In the present embodiment, the detected diagram and the basic diagram are compared with each other to determine whether the deviation amount Td1 of the rising timing (Td1=t1−t10) is greater than a permissible level (for example, whether Td1>a predetermined determination value) in a state where a deviation amount in the rising angle between the both diagrams is within a permissible level (for example, the deviation amount in the rising angle<a predetermined determination value) (in this example, the deviation amount in the rising angle is zero). If the deviation amount Td1 of the rising timing of the first corner P1 is greater than the permissible level, the above-described correction coefficients (equivalent to the injection command) are produced so that the rising timings of the both diagrams coincide with each other. That is, the rising timing tp1 of the pulse signal INJ is advanced by the deviation amount Td1 of the rising timing with the use of the correction coefficients. Thus, as shown in FIG. 17, the pulse signal with rising timing tp1a is produced.

Figure 18:
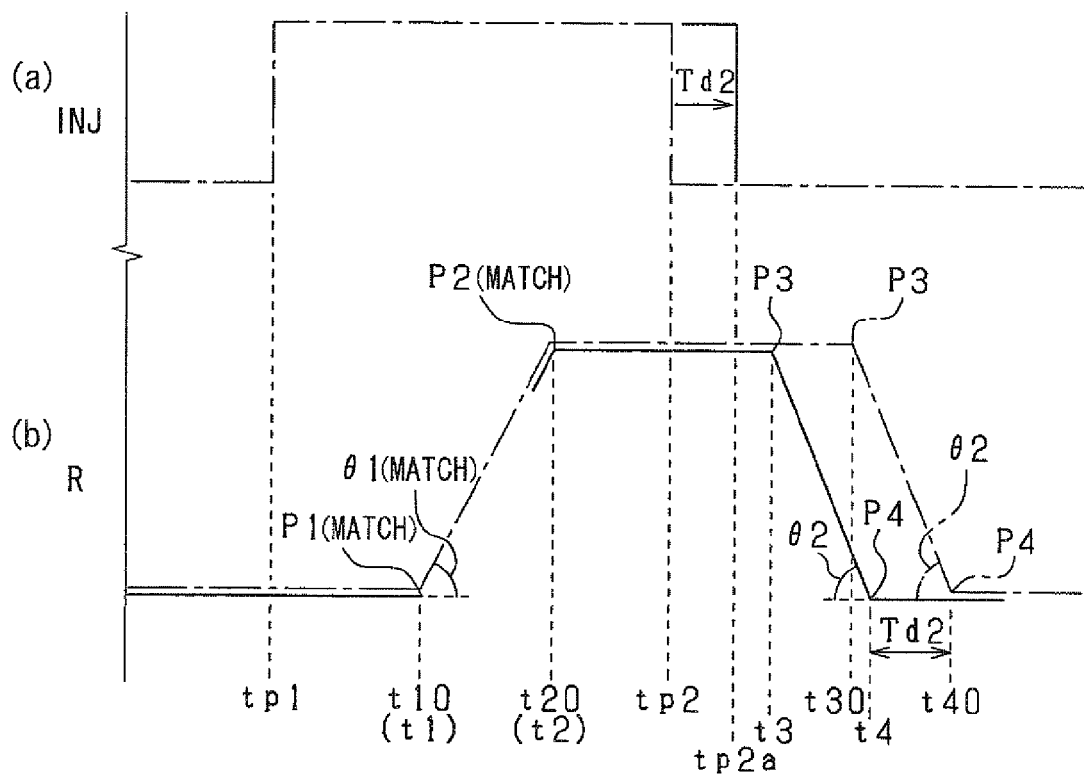
FIG. 18 is a time chart showing another updating mode of the correction coefficient according to the embodiment.

In an example shown in FIG. 18, there occurs a deviation between the return timings of the fourth corners P4 (i.e., the injection end timings) of the detected diagram and the basic diagram while the return angles of the fourth corners P4 are the same angle ($\theta2$). In this example, a deviation amount Td2 is caused between the timing t40 of the fourth corner P4 of the basic diagram and the timing t4 of the fourth corner P4 of the detected diagram. The first corner P1 and the second corner P2 of the detected diagram match with those of the basic diagram respectively but the third corner P3 and the fourth corner P4 of the detected diagram are deviated from those of the basic diagram in a direction parallel to the time axis. In more detail, the actually detected return timing t4 is earlier than the timing t40 of the reference diagram (i.e., the basic diagram).

In the present embodiment, the detected diagram and the basic diagram are compared with each other to determine whether the deviation amount Td2 between the return timings (Td2=40−t4) is greater than a permissible level (for example, whether Td2>a predetermined determination value) in a state where the deviation amount in the return angle between the both diagrams is within a permissible level (for example, the deviation amount in the return angle<a predetermined determination value) (in this example, the deviation amount in the return angle is zero). If the deviation amount Td2 of the return timing of the fourth corner P4 is greater than the permissible level, the above-described correction coefficients (equivalent to the injection command) are produced so that the return timings of the both diagrams coincide with each other. That is, falling timing tp2 of the pulse signal is delayed by the deviation amount Td2 of the return timing with the use of the correction coefficients. Thus, as shown in FIG. 18, the pulse signal with falling timing tp2a is produced.

Figure 19:
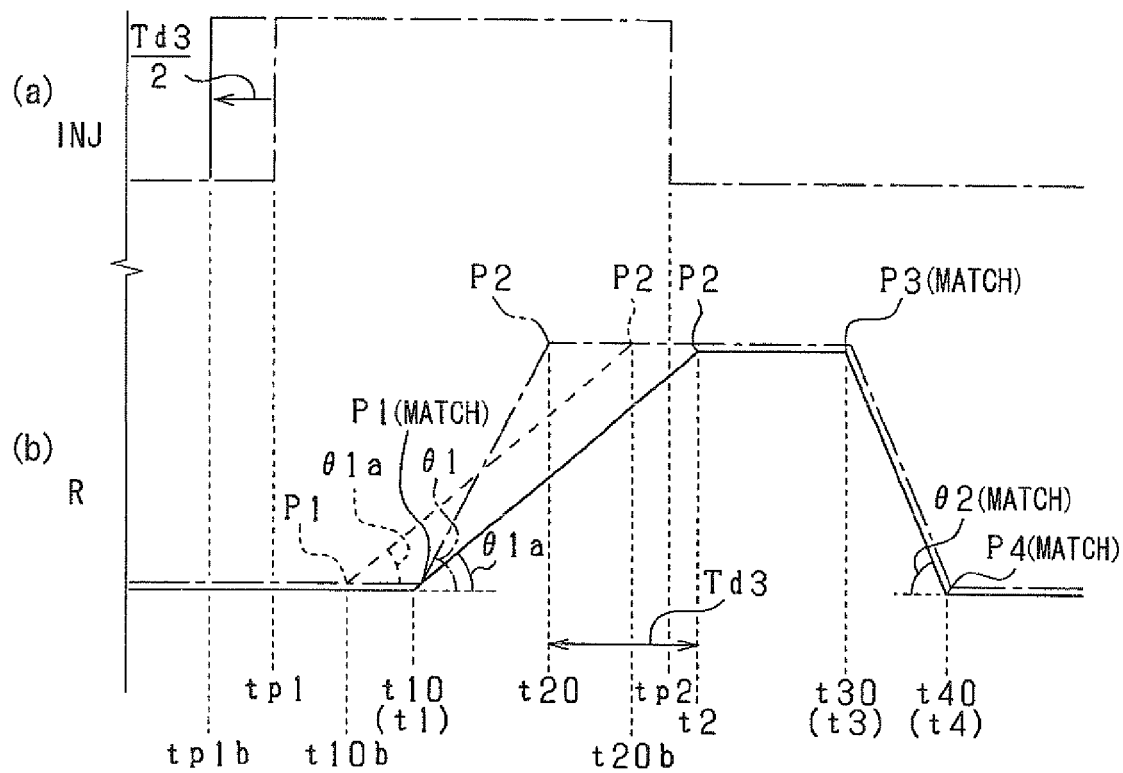
FIG. 19 is a time chart showing another updating mode of the correction coefficient according to the embodiment.

In an example shown in FIG. 19, there occurs a deviation between the rising angles (angle $\theta1a$ and angle $\theta1$) of the first corners P1 of the detected diagram (shown by a solid line) and the basic diagram (shown by a chained line) The first corner P1, the third corner P3 and the fourth corner P4 of the detected diagram match with those of the basic diagram respectively but only the second corner P2 of the detected diagram is delayed from that of the basic diagram in a direction parallel to the time axis.

In the present embodiment, the detected diagram is compared with the basic diagram to determine whether a deviation amount between the rising angles of the first corners P1 of the both diagrams is greater than a permissible level (for example, whether $\theta1-\theta1a$>predetermined determination value). If the deviation amount of the rising angle of the first corner P1 is greater than the permissible level, the above-described correction coefficients (equivalent to the injection command) are produced without performing the adjustment of the rising angle such that the rising timing t1 of the first corner P1 and the stabilization timing t2 of the second corner P2 of the detected diagram move in a direction for equalizing the areas of both diagrams, or more specifically, such that the timings t1, t2 of the detected diagram move to timings t10b, t20b respectively as shown by a broken line in FIG. 19. That is, the rising timing tp1 of the pulse signal is advanced by a half (Td3/2) of a deviation amount Td3 between the stabilization timings of the detected diagram and the basic diagram (Td3=t2−t20) with the use of the correction coefficients. Thus, as shown in FIG. 19 the pulse signal with the rising timing tp1b is produced.

Figure 20:
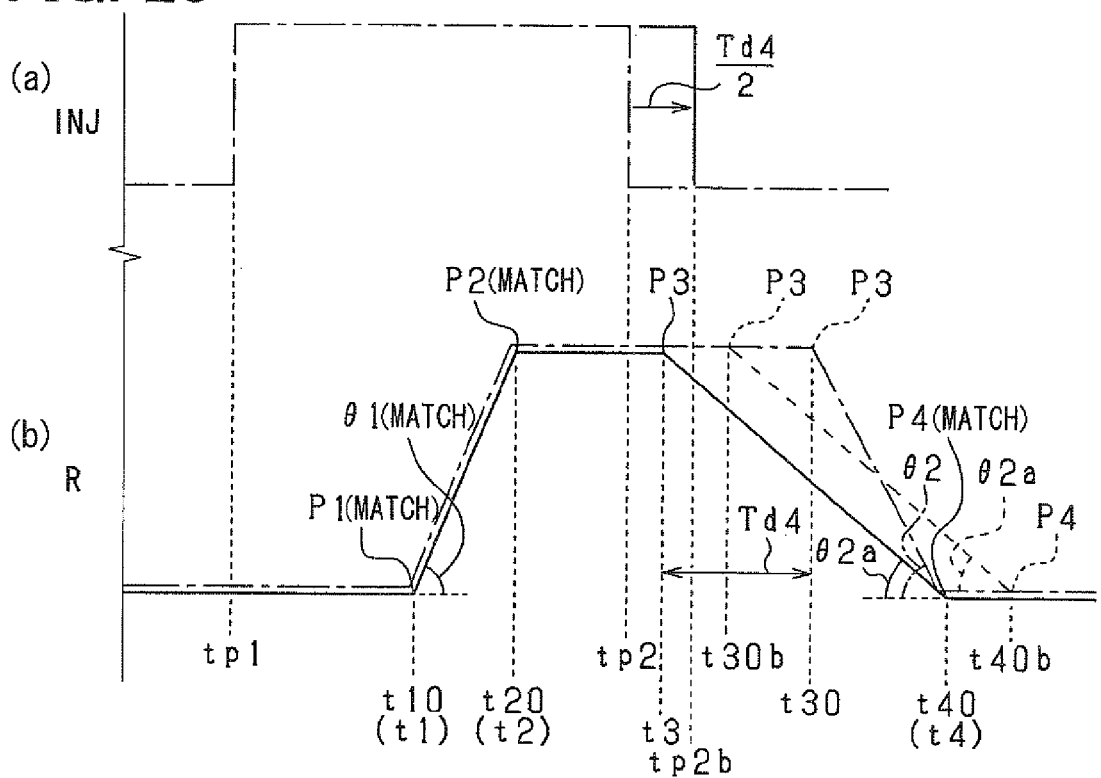
FIG. 20 is a time chart showing another updating mode of the correction coefficient according to the embodiment.

In an example shown in FIG. 20, there occurs a deviation between the falling angles (angle $\theta2a$ and angle $\theta2$) of the third corners P3 of the detected diagram (shown by a solid line) and the basic diagram (shown by a chained line). The first corner P1, the second corner P2 and the fourth corner P4 of the detected diagram match with those of the basic diagram respectively but only the third corner P3 of the detected diagram is deviated from that of the basic diagram in a direction parallel to the time axis. In more detail, the actually detected failing timing t3 is earlier than the timing t30 of the reference diagram.

In the present embodiment, the detected diagram is compared with the basic diagram to determine whether a deviation amount between the return angles of the fourth corners P4 of the both diagrams is greater than a permissible level (for example, whether θ2-θ2a>predetermined determination value). If the deviation amount of the return angle of the fourth corner P4 is greater than the permissible level, the above-described correction coefficients (equivalent to the injection command) are produced without performing the adjustment of the return angle such that the falling timing t3 of the third corner P3 (the timing at which the injection rate R starts decreasing after reaching the maximum injection rate) and the return timing t4 of the fourth corner P4 (the injection end timing) of the detected diagram move in a direction for equalizing the areas of both diagrams, or more specifically, such that the timings t3, t4 of the detected diagram move to timings t30b, 40b respectively as shown by a broken line in FIG. 20. That is, the falling timing tp2 of the pulse signal is delayed by a half (Td4/2) of a deviation amount Td4 (Td4=t30−t3) between the falling timings of the detected diagram and the basic diagram with the use of the correction coefficients. Thus, as shown in FIG. 20, the pulse signal with falling timing tp2b is produced.

Figure 21:
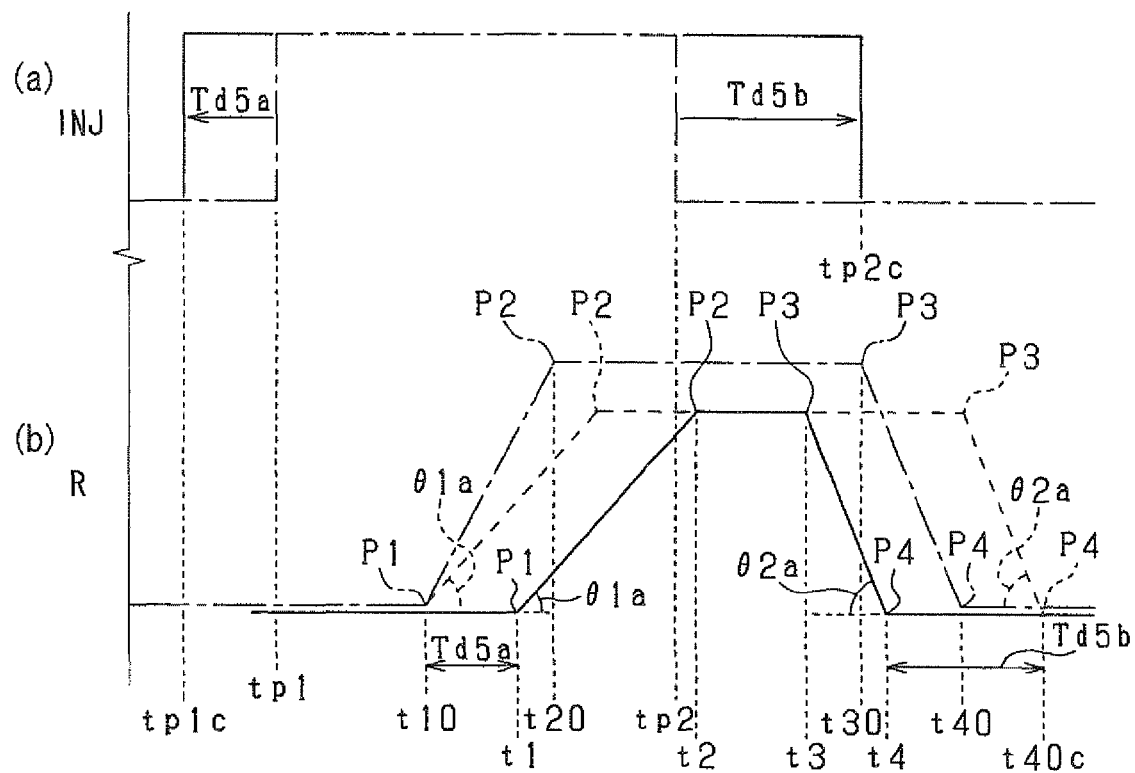
FIG. 21 is a time chart showing yet another updating mode of the correction coefficient according to the embodiment.

In an example shown in FIG. 21, there occurs deviations in the timings of the first to fourth corners P1-P4 and also in the injection rate R between the detected diagram (shown by a solid line) and the basic diagram (shown by a chained line). In the present embodiment, the area of the detected diagram is approximated to that of the basic diagram in priority to the timings of the four corners or the injection rate R. In this case, the timings of the first to fourth corners P1-P4 are adjusted without adjusting the maximum injection rate (equivalent to the height D of the trapezoid shown in FIG. 5) or the angles θ1a, E2a. Moreover, on the occasion of the adjustment, the first corner P1 among the four corners of the detected diagram is approximated to that of the basic diagram in priority to the fourth corner P4. Specifically, the above-described correction coefficients (equivalent to the injection command) are produced such that the timing t4 of the fourth corner P4 of the detected diagram moves to timing t40c to equalize the areas of both diagrams while the timing t1 of the first corner P1 of the detected diagram is conformed to the timing t10 of the first corner P1 of the basic diagram. That is, the rising timing tp1 of the pulse signal is advanced by a deviation amount Td5a of the timing t1 of the first corner P1 (Td5a=t1−t10) and the falling timing tp2 of the pulse signal is delayed by a deviation amount Td5b of the timing t4 of the fourth corner P4 (Td5b=t40c−t4) with the use of the correction coefficients. Thus, as shown in FIG. 21, the pulse signal with the rising timing tp1c and the falling timing tp2c is produced. Thus, even if the trapezoid has the maximum injection rate different from that of the basic diagram, the areas of the detected diagram and the basic diagram can be equalized.

Thus, in the present embodiment, the diagram (including the parameters thereof) as the profile of the injection rate transition of the target injector 20 at the time is detected based on the output of the fuel pressure sensor 20a. Then, the injection command to the aforementioned injector 20 is variably set by updating the correction coefficients for the reference injection map (S12 of FIG. 4) based on the detected diagram and the basic diagram based on a predetermined map such that the diagram as the actual profile of the injection rate transition becomes a diagram that belongs to the basic diagram and has the same area as the basic diagram.

As explained above, the fuel injection control device according to the present embodiment exerts following outstanding effects.

(1) The fuel injection control device (the ECU 30 for engine control) according to the above-described embodiment is applied to the fuel supply system that performs the injection supply of the fuel into the cylinder as a portion performing the fuel combustion of the target engine with the predetermined injector (injector 20) and controls the injection supply of the fuel to the target engine. The fuel injection control device includes the program (a fuel pressure sensing device: S21 of FIG. 6) that sequentially senses the fuel pressure fluctuating with the injection by the injector 20. The fuel injection control device includes the program (a diagram detecting device) that detects the diagram (and the parameters thereof) as the profile of the transition of the current fuel quantity injected from the injector 20 per unit time (i.e., the injection rate) based on the transition of the fuel pressure P sequentially sensed by the above program (the fuel pressure sensing device). The fuel injection control device includes the program (an injection varying device: S12 and S13 of FIG. 4 and FIGS. 17 to 21) that varies the injection command to the injector 20 such that the diagram as the actual profile of the injection rate transition becomes the diagram that belongs to the basic diagram thereof based on the diagram that is the profile of the injection rate transition and that is detected by the above program (the diagram detecting device) and the predetermined basic diagram. With such the configuration, appropriate fuel injection control can be performed by adjusting the injection characteristic in accordance with the injection characteristic of each time.

(2) The fuel injection control device according to the above-described embodiment is applied to the common rail type fuel injection system that has the common rail 12 and the fuel pressure sensor (the fuel pressure sensor 20a). The common rail 12 accumulates the fuel to be supplied to the injector 20 under pressure. The fuel pressure sensor senses the pressure of the fuel flowing through the inside of the fuel passage (the pipe 14) extending from the common rail 12 to the fuel injection hole (the injection hole 20f) of the injector 20 at the predetermined point downstream of the neighborhood of the fuel discharge hole of the common rail 12 with respect to the fuel flow direction in the fuel passage, or more specifically, at a point on the injector 20 side of the connection section 12a (i.e., the orifice), or further specifically, at the fuel inlet of the injector 20 corresponding to a position closer to the fuel injection hole of the injector 20 than the common rail 12. In more detail, the fuel pressure sensor 20a for sensing the fuel pressure is attached to the position closer to the fuel injection hole of the injector 20 than the common rail 12 in the pipe 14 connected to the fuel discharge side of the common rail 12. More specifically, the fuel pressure sensor 20a is attached to the fuel inlet of the injector 20. In S21 of FIG. 6, the pressure of the fuel supplied to the injector 20 is sequentially sensed based on the output of the fuel pressure sensor 20a. Thus, the pulsation pattern (surge characteristic or the like) indicating the injection characteristic of each time including the temporal characteristic change can be sensed with high accuracy. Eventually, the appropriate fuel injection control can be performed by appropriately adjusting the injection characteristic in accordance with the injection characteristic of each time.

(3) The fuel pressure sensor 20a is provided on the injector 20 side of the connection section 12a (the orifice). Therefore, the pressure fluctuation mode can be sensed with the fuel pressure sensor 20a before the fuel pulsation is reduced by the orifice. Eventually, the pressure fluctuation mode can be sensed with high accuracy.

(4) A rail pressure sensor, which is normally attached to the common rail 12, is omitted, so a wide space can be ensured near the common rail 12. With the structure having the above-described fuel pressure sensor 20a, the usual fuel injection control can be performed appropriately based on the sensor output of the fuel pressure sensor 20a even if the rail pressure sensor is omitted as described above.

(5) In the processing of FIG. 6, the sensor output of the above-described fuel pressure sensor 20a is sequentially obtained at a relatively short interval, at which the profile of the pressure transition waveform can be created with the sensor output. Thus, the above-described pressure transition waveform (i.e., the pressure fluctuation mode) can be appropriately sensed with high accuracy.

(6) In the processing of FIG. 6, the sensor output of the above-described fuel pressure sensor 20a is sequentially obtained at an interval of 20 μsec. Thus, the above-described pressure transition waveform (i.e., the pressure fluctuation mode) can be grasped appropriately.

(7) The fuel pressure sensor 20a is provided to each one of the fuel inlets of the injectors 20 of the cylinders #1-#4. Thus, mountability and maintenance performance of each fuel pressure sensor 20a are improved and the pressure can be sensed with high accuracy and relatively high stability.

(8) The trapezoid is adopted as the basic diagram. When the hydraulic drive type injector shown in FIG. 2 is adopted, the diagram as the profile of the injection rate transition is normally the trapezoid. Therefore, the above configuration is specifically effective.

(9) The fuel injection control device includes the program (a basic diagram varying device: S12 of FIG. 4) that variably sets the parameters of the basic diagram in accordance with the predetermined parameters (e.g., the fuel pressure, the engine rotation speed, the accelerator operation amount and the like acquired in S11 of FIG. 4). With such the construction, the parameters of the basic diagram can be varied in accordance with the situation of each time, and eventually the above-described device can be realized in a more practical form. In the above-described embodiment, the basic diagram (i.e., the kind of the basic diagram) is invariably the trapezoid irrespective of the contents of the parameters acquired in S11 of FIG. 4. However, the kind of the basic diagram may be variably set.

(10) Through the processing in S12 and S13 of FIG. 4 and FIGS. 17 to 21, the injection command to the injector 20 is produced based on the detected diagram and the basic diagram such that the diagram as the actual profile of the injection rate transition becomes the diagram having the same area as the basic diagram. Thus, appropriate fuel injection control can be performed.

(11) Through the processing of S12 and S13 of FIG. 4 and FIGS. 17 to 21, the detected diagram and the parameters of the detected diagram are compared with the basic diagram and the parameters of the basic diagram. Then, the injection command to the injector 20 is varied to approximate the predetermined parameter (the area or the timing of the corner) of the detected diagram to the corresponding parameter (the area or the timing of the corner) of the basic diagram. Thus, the diagrams can be conformed or approximated to each other, and eventually, appropriate fuel injection control can be performed.

(12) Through the same processing, the area of the detected diagram is approximated to the area of the basic diagram in priority to the timings of the four corners P1-P4 of the diagram (shown in FIG. 5). Thus, the fuel supply to the target engine with the appropriate fuel injection quantity can be performed.

(13) Through the same processing (specifically the processing of FIG. 21), the first corner P1 of the trapezoid that appears at the earliest timing in the chronological order among the four corners P1-P4 of the detected diagram (shown in FIG. 5) is approximated to that of the basic diagram in priority to the fourth corner P4 of the trapezoid that appears at the latest timing in the chronological order. Thus, the fuel supply to the target engine can be performed at the appropriate injection start timing. Eventually, ignition timing or the like can be also adjusted to proper timing.

(14) Through the same processing (specifically, the processing of FIG. 17), the detected diagram and the parameters of the detected diagram are compared with the basic diagram and the parameters of the basic diagram. If the deviation amount of the rising timing of the first corner P1 (i.e., the injection start timing), which appears at the earliest timing in the chronological order among the four corners P1-P4 of the trapezoid (shown in FIG. 5), between the both diagrams is greater than the permissible level when both of the diagrams are the trapezoids and the deviation amount of the rising angle of the first corner P1 between the both diagrams is within the permissible level, the injection command to the injector 20 is produced such that the rising timings of the both diagrams coincide with each other. Thus, the fuel injection control can be performed in an appropriate manner.

(15) Through the same processing (specifically, the processing of FIG. 18), the detected diagram and the parameters of the detected diagram are compared with the basic diagram and the parameters of the basic diagram. If the deviation amount of the return timing of the fourth corner P4 (i.e., the injection end timing), which appears at the latest timing in the chronological order among the four corners P1-P4 of the trapezoid (shown in FIG. 5), between the both diagrams is greater than the permissible level when both of the diagrams are the trapezoids and the deviation amount of the return angle of the fourth corner P4 between the both diagrams is within the permissible level, the injection command to the injector 20 is produced such that the return timings of the both diagrams coincide with each other. Thus, the fuel injection control can be performed in an appropriate manner

(16) Through the same processing (specifically, the processing of FIG. 19), the detected diagram and the parameters of the detected diagram are compared with the basic diagram and the parameters of the basic diagram. When both of the diagrams are the trapezoids and the deviation amount of the rising angle of the first corner P1 of the trapezoid, which appears at the earliest timing in the chronological order among the four corners P1-P4 of the trapezoid (shown in FIG. 5), between the both diagrams is greater than the permissible level, the injection command to the injector 20 is produced without performing the adjustment of the rising angle such that the rising timing of the first corner P1 of the detected diagram and the stabilization timing of the second corner P2 of the trapezoid, which appears at the second timing in the chronological order, move in the direction for equalizing the areas of the both diagrams. Thus, the fuel injection control can be performed in an appropriate manner.

(17) Moreover, in this case, through the same processing (specifically, the processing of FIG. 19), each of the rising timing and the stabilization timing of the detected diagram is moved by the half of the deviation amount of the rising timing and the stabilization timing between the detected diagram and the basic diagram. Thus, the fuel injection control can be performed in an appropriate manner.

(18) Through the same processing (specifically, the processing of FIG. 20), the detected diagram and the parameters of the detected diagram are compared with the basic diagram and the parameters of the basic diagram. When both of the diagrams are the trapezoids and the deviation amount of the return angle of the fourth corner P4 of the trapezoid, which appears at the latest timing in the chronological order among the four corners P1-P4 of the trapezoid (shown in FIG. 5), between the both diagrams is greater than the permissible level, the injection command to the injector 20 is produced without performing the adjustment of the return angle such that the falling timing of the third corner P3 of the detected diagram and the return timing of the fourth corner P4 of the trapezoid move in the direction for equalizing the areas of the both diagrams. Thus, the fuel injection control can be performed in an appropriate manner

(19) Moreover, in this case, through the same processing (specifically, the processing of FIG. 20), the falling timing and the return timing of the detected diagram are moved respectively by the half of the deviation amount of the falling timing and the return timing between the detected diagram and the basic diagram. Thus, the fuel injection control can be performed in an appropriate manner.

(20) In the same processing (specifically, the processing of S12 and S13 of FIG. 4), updating of the correction coefficients for the predetermined reference map, in which the injection command used when performing the injection control with the above-described injector 20 is written, is enabled. Thus, the injection command to the injector 20 can be varied. Accordingly, the injection command to the injector 20 can be varied easily and appropriately.

(21) The injection command to the injector 20 is produced such that the injection result (injection data) obtained based on the fuel pressure transition sensed during the present combustion cycle of the target engine is reflected in the injection in the subsequent combustion cycle. The production of the injection command is continuously performed while applying such the feedback to the injection command. Thus, appropriate fuel injection can be performed over a long time.

(22) The injector for performing the injection supply of the fuel to the target engine is the injector (injector 20) that has the fluid control valve (i.e., the outer valve 202b) and the needle (needle 20c). The fluid control valve controls the inflow of the fluid to the predetermined space (i.e., the oil pressure chamber Cd) and the outflow of the fluid from the same space. The needle (needle 20c) performs reciprocation operation inside the valve body of the aforementioned injector in accordance with the pressure change of the oil pressure chamber Cd accompanying the inflow and the outflow of the fluid and opens/closes the fuel supply passage extending to the injection hole 20f, thereby performing the valve opening/valve closing of the aforementioned injector. With such the fuel injection control device, appropriate fuel injection control can be performed by adjusting the injection characteristic of a general injector in accordance with the injection characteristic of each time without necessitating adoption of a special injector.

The above described embodiment may be modified and implemented as follows, for example.

In the above-described embodiment, the orifice is provided in the connection section 12a to reduce the pressure pulsation in the common rail 12. Alternatively, a flow damper (a fuel pulsation reducing device) may be provided in place of the orifice or with the orifice to reduce the pressure pulsation in the common rail 12.

In the above-described embodiment, the sensing period and the stoppage period are set in the mode shown in FIG. 7 or 8. The present invention is not limited thereto but the sensing period or the stoppage period may be set in an arbitrary mode. The sensing period or the stoppage period may be set as a fixed value obtained through experiment or the like. Alternatively, the sensing period or the stoppage period may be set using a map or the like as a variable value corresponding to the situation of each time (specifically, the engine operation state). The stoppage period may be omitted if it is unnecessary.

The injection command to the above-described injector 20 may be corrected during one combustion cycle. For example, the fuel injection control device may include a program that uses a pressure transition sensed until the present time based on the fuel pressure transition sequentially sensed by the processing of S21 of FIG. 6 in a combustion cycle of the target engine to correct the injection command to the injector 20 (for example, the energization period (pulse width) of the injector 20) about a predetermined operation concerning the fuel injection of the injector 20 to be performed after the present time in the same cycle. Thus, in accordance with an error in the area of the detected diagram (i.e., the injection quantity) up to the time, the injection command (for example, a valve-closing command or the like) of the injector 20 concerning the operation after the time can be adjusted. Eventually, the injection quantity error resulting from the deviation in the area of the detected diagram can be compensated to maintain the fuel injection quantity at the time to be appropriate.

In the above-described embodiment, adoption of the adaptation map (used in S12 of FIG. 4), whose adaptation values are decided beforehand through the experimentation or the like, is supposed, and the correction coefficient for correcting the injection characteristic based on the adaptation map is updated. Alternatively, in place of the correction coefficient, the corrected value (i.e., a value reflecting the correction coefficient) may be stored in the EEPROM or the like. If the corrected value has sufficient reliability with such construction, a construction not requiring the above-described adaptation map, i.e., an adaptation-less construction, can be adopted.

The trapezoid is adopted as the basic diagram in the above-described embodiment. Alternatively, an arbitrary diagram can be employed as the basic diagram. However, in order to provide a highly practical structure that reflects the characteristic of a general injector, it is effective to adopt one of the triangle, the trapezoid and the rectangle or a diagram as combination of multiplicity of at least one kind of the three shapes as a basic diagram. As a typical example, a rectangular shape, a triangular shape (a delta shape), a boot shape (equivalent to combination of two trapezoids) and the like are known in addition to the above-described trapezoidal shape.

In the above-described embodiment, the diagram as the profile of the injection rate transition is variably controlled by varying the injection command to the injector. Alternatively, the diagram as the profile of the injection rate transition (the kind of the diagram or the parameters of the diagram) may be variably controlled by varying the injection condition of the injector. For example, the diagram as the profile of the injection rate transition may be variably controlled in modes shown in FIGS. 22A to 22C.

Figure 22A:
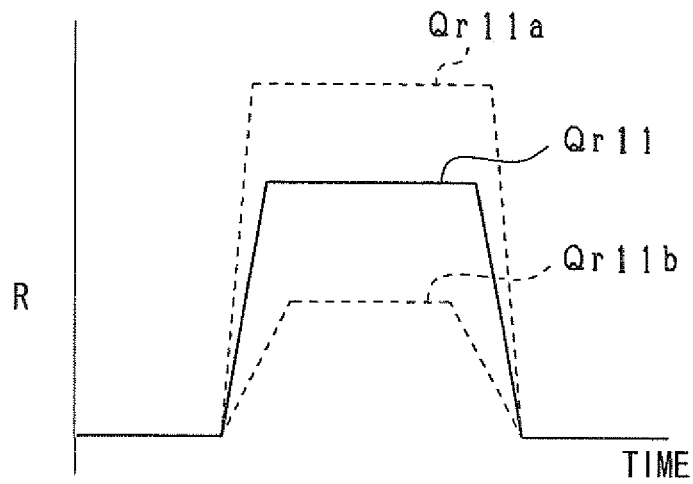
FIGS. 22A to 22C are time charts each showing a variable control mode of a diagram as a profile of an injection rate transition according to the embodiment.
Figure 22B:
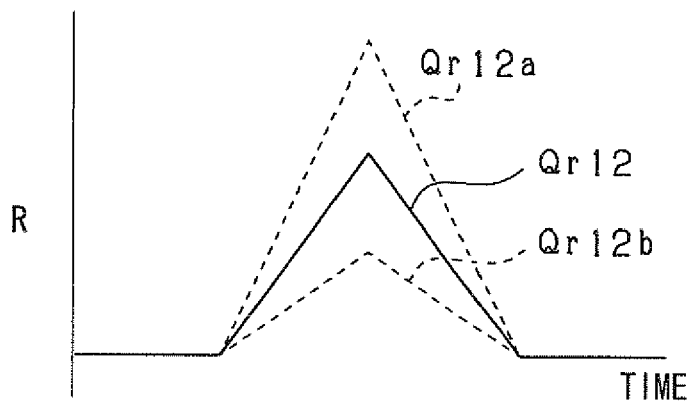

In the example shown in FIG. 22A or 22B, rising and falling speed of the injection rate R is adjusted in each of injection rate characteristics Qr11, Qr12 in a trapezoidal shape or a triangular shape (a delta shape). In more detail, in FIG. 22A or 22B, each of injection rate characteristics Qr11a, Qr12a shows an example of increasing the rising and falling speed of the injection rate R, and each injection rate characteristics Qr11b, Qr12b shows an example of reducing the rising and failing speed of the injection rate R. Adjustment of the rising and falling speed can be performed by adjusting the pressure in the common rail 12 and the eventual injection pressure (corresponding to one of the injection conditions of the injector), for example. This scheme uses the relationship that the rising and falling speed of the injection rate becomes quicker as the injection pressure increases.

For example, the pressure in the common rail 12 can be varied by varying the pumping quantity of the fuel pump 11 that pumps and supplies the fuel to the injector 20, or more specifically, by adjusting the drive current amount of the suction control valve 11c (shown in FIG. 1). For example, the pressure in the common rail 12, and eventually, the rising and falling speed of the injection rate R and the maximum injection rate are increased by increasing the pumping quantity of the fuel pump 11.

In addition, the pressure in the common rail 12 can be varied by providing a pressure reducing valve in the injector 20 or in the fuel supply passage thereof (for example, in the common rail 12) and by varying a valve opening degree of the pressure reducing valve. For example, the pressure in the common rail 12, and eventually, the rising and falling speed of the injection rate R and the maximum injection rate are decreased by increasing the valve opening degree of the pressure reducing valve.

Figure 23:
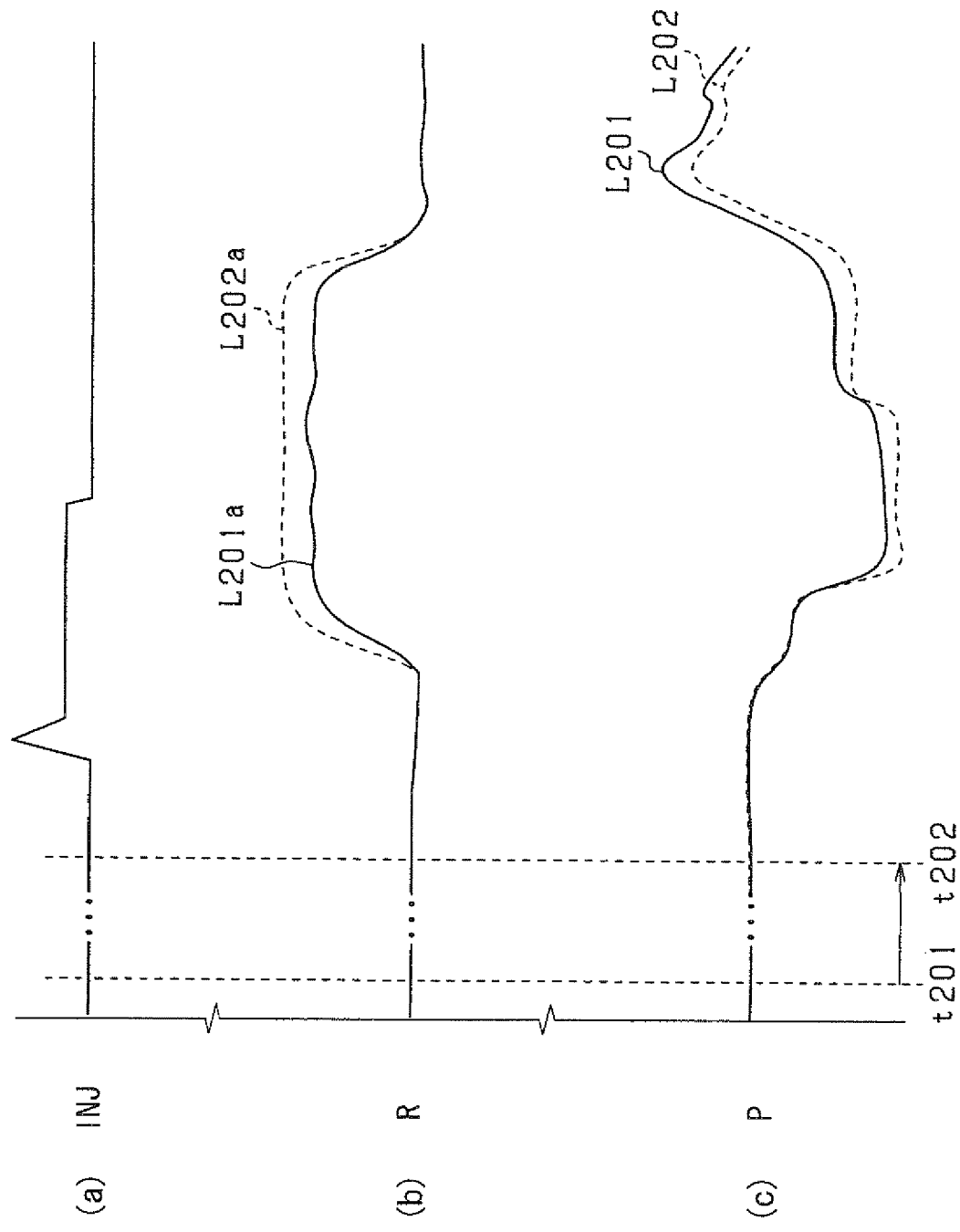
FIG. 23 is a time chart showing a pressure varying mode according to the embodiment.

In addition, the pressure in the common rail 12 can be varied by varying the pumping timing of the fuel pump 11 that pumps and supplies the fuel to the injector 20. FIG. 23 is a time chart showing an example of the pressure variation mode. In FIG. 23, part (a) is a time chart showing a transition of the injection command signal INJ (the pulse signal) to the injector 20, part (b) is a time chart showing a transition of the injection rate R, and part (c) is a time chart showing a transition of the fuel pressure P (i.e., the inlet pressure) sensed with the above-described fuel pressure sensor 20a.

In the example shown in FIG. 23, in order to approximate fuel pumping timing t201 of the pump 11 to the injection start timing, for example, the timing t201 is changed to timing t202 shown in FIG. 23. By bringing the pumping timing of the fuel pump close to the injection start timing in this way, the pressure transition P (i.e., the actual measurement value measured by the fuel pressure sensor 20a) changes from a solid line L201 to a broken line L202, and, the injection rate transition R changes from a solid line L201a to a broken line L202a in FIG. 23, respectively Eventually, the rising and falling speed of the injection rate R and the maximum injection rate increase.

When an injector having multiple types of switchable injection holes (for example, multiple injection holes having different shapes) is adopted as an injector that injects and supplies the fuel to the target engine, the injection pressure of the injector may be varied by switching the injection holes. When the injector has a pressure intensifying mechanism, the injection pressure of the injector may be varied by operating the pressure intensifying mechanism.

Furthermore, an injector adopted as an injector that performs injection supply of the fuel to the target engine may have a needle, which performs valve opening and valve closing of the injector by opening and closing (blocking) an injection hole (equivalent to a fuel injection hole) or a fuel supply passage extending to the injection hole based on a predetermined reciprocating operation of the needle inside a valve body, and may continuously vary an amount of the reciprocating motion of the needle in accordance with an injection command to the injector. In such the case, a diagram as a profile of an injection rate transition can be variably controlled with a higher degree of freedom through the injection command to the aforementioned injector.

Figure 24:
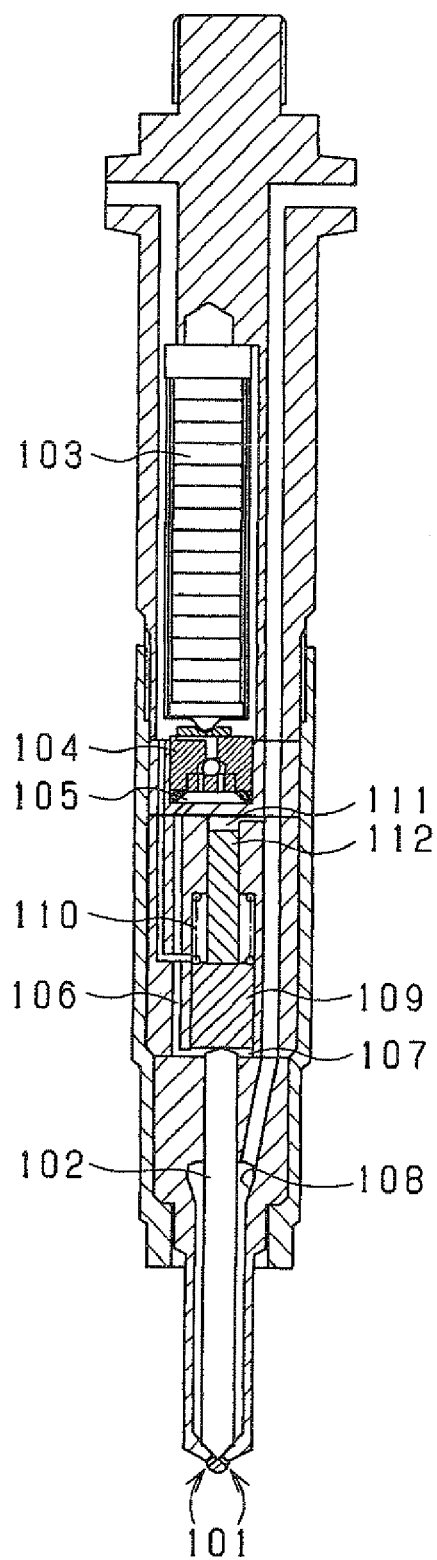
FIG. 24 is a cross-sectional view showing an internal structure of a direct acting piezo injector according to the embodiment.

FIG. 24 shows an example of a structure of the injector of this kind, i.e., a direct acting piezo injector.

As shown in FIG. 24, for example, the injector has a piezoelectric element 103 consisting of a laminated body (a piezo stack) of a piezoelectric material such as PZT as a drive device that directly drives a needle 102, which performs valve opening and valve closing of the aforementioned injector (in more detail, an injection hole 101). That is, the injector applies a predetermined voltage to the piezoelectric element 103 when the injector performs the fuel injection. If the application of the voltage to the piezoelectric element 103 is started to perform the fuel injection, a piezo piston 104 is displaced toward an injector tip end side (i.e., toward the injection hole 101 side) with the extension of the piezoelectric element 103. Thus, fuel pressure in a second oil-tight chamber 105, a transmission passage 106 and a first oil-tight chamber 107 increases. Eventually, a force of the high-pressure fuel in a needle chamber 108 to push the needle 102 toward an injector rear side and a force of the fuel in the first oil-tight chamber 107 to push a needle stopper 109 toward the injector rear side increase. If summation of the forces exceeds summation of a force of a spring 110 and low-pressure fuel to push the needle stopper 109 toward the injector tip end side and a force of high-pressure fuel in a balance chamber 111 to push a back side of a balance piston 112 toward the injector tip side, the needle 102 is displaced toward the injector rear side and the aforementioned injector opens. Thus, the fuel inside the injector is injected to an outside through the injection hole 101.

If the application of the voltage to the piezoelectric element 103 is stopped, the piezo piston 104 is displaced toward the injector rear side with contraction of the piezoelectric element 103. Accordingly, the fuel pressure in the second oil-tight chamber 105, the transmission passage 106, and the first oil-tight chamber 107 falls. Eventually, the force of the spring 110 and the low-pressure fuel to push the needle stopper 109 toward the injector tip end side and the force of the high-pressure fuel in the balance chamber 111 to push the back side of the balance piston 112 toward the injector tip end side increase. If summation of the forces exceeds summation of the force of the high-pressure fuel in the needle chamber 108 to push the needle 102 toward the injector rear side and a force of the fuel in the first oil-tight chamber 107 to push the needle stopper 109 toward the injector rear side, a force directed toward the injector tip end side is applied to the needle 102 and the piezo injector is closed. Thus, the fuel injection ends.

In this injector, a displacement amount of the needle 102 (i.e., a reciprocating amount) toward the injector rear side, i.e., a lift amount, changes continuously in accordance with a displacement amount of the piezoelectric element 103, and eventually, the injection command to the aforementioned injector (i.e., an energization amount of the piezoelectric element 103). The lift amount is proportional to the displacement amount of the piezoelectric element 103, for example. Therefore, the lift amount can be arbitrarily controlled from a zero lift amount corresponding to the valve-closing of the aforementioned injector to a full lift amount as the maximum lift amount.

Figure 22C:
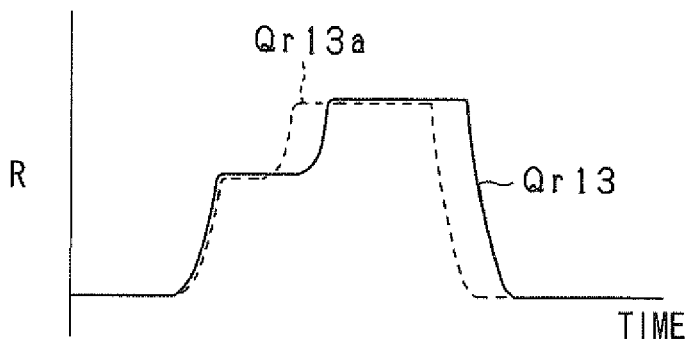

When such the direct acting injector is employed, as shown in FIG. 22C, fuel injection of performing stepwise rising and falling, i.e., fuel injection with a boot-shape injection rate characteristic Qr13, can be performed. In addition, the diagram as the profile of the injection rate transition can be variably controlled with a high degree of freedom based on the injection command to the aforementioned injector. For example, the increasing timing of the injection rate R can be advanced from the injection rate characteristic Qr13 to an injection rate characteristic Qr13a as shown in FIG. 22C. With the above described direct acting injector, such the adjustment of the rising/falling timing can be easily performed by adjusting the injection command to the injector.

Also in the case where such the direct acting injector is employed, when there occur deviations in all of the timings of the first to fourth corners P1-P4 and also in the injection rate R between the detected diagram (shown by a solid line) and the basic diagram (shown by a chained line) as shown in FIG. 21, it is effective to approximate the area of the detected diagram to the area of the basic diagram in priority to the timings of the four corners or the injection rate R. In this case, it is effective to produce the injection command to the aforementioned injector such that the four corners of the detected diagram are approximated to those of the basic diagram in a priority order of the first corner P1 of the trapezoid, which appears at the earliest timing in the chronological order, the fourth corner P4 of the trapezoid, which appears at the latest timing in the chronological order, the second corner P2 of the trapezoid, which appears at the second timing in the chronological order, and the third corner P3 of the trapezoid, which appears at the third timing in the chronological order (i.e., such that the errors decrease in this order) and such that the timings of the corners and the injection rate of the diagram as the actual profile of the injection rate transition are conformed (or approximated) to those of the basic diagram.

In the case of the multiple injection, such the estimation and the adjustment of the injection rate characteristic (the fluctuation mode of the injection rate) may be performed also for injections performed before or after the main injection (for example, the pilot injection, the post-injection, or the like) in place of or in addition to the main injection.

An inflection point of the pressure transition may be obtained as a starting point of steep pressure rising, in which a pressure change amount per unit time exceeds a predetermined level, or for example, as timing at which a second order differential value ddP of the fuel pressure P acquired through the processing of S23 of FIG. 6 shifts from a smaller side than a predetermined threshold value to a larger side than the predetermined threshold value. Then, timing (the timing t3) when the injection rate R starts decreasing after reaching the maximum injection rate of the above-described injector 20 may be detected based on the pressure inflection point (refer to part (d) of FIG. 10). Thus, the timing t3 can be detected appropriately.

In the above-described embodiment, the fuel pressure sensor 20a for sensing the fuel pressure is attached to the fuel inlet of the above-described injector 20. Alternatively, the fuel pressure sensor 20a may be provided inside the injector 20 (for example, near the injection hole 20f shown in FIG. 2). Arbitrary number of the fuel pressure sensor(s) may be used. For example, two or more sensors may be provided to the fuel flow passage of each cylinder. In the above-described embodiment, the fuel pressure sensor 20a is provided to each cylinder. Alternatively, the sensor(s) may be provided only in a part of the cylinders (for example, one cylinder), and an estimate based on the sensor output may be used for the other cylinder(s).

In the above-described embodiment, the cylinder pressure sensor 53 is provided to each cylinder. Alternatively, the sensor(s) may be provided only in a part of the cylinders (for example, one cylinder). In the case where the cylinder pressure sensor(s) is/are provided only in a part of the cylinders in this way without providing the sensor(s) in the other cylinder (s), it is effective to use a configuration of estimating the cylinder pressure of the other cylinder(s) using the actual measurement value of the cylinder pressure obtained in the cylinder(s) provided with the cylinder pressure sensor(s). Thus, the cylinder pressure of many cylinders can be measured while minimizing the number of the sensor(s) and a computation load. Moreover, the injection characteristics (the injection quantity and the like) can be controlled with high accuracy based on the measurement value. The cylinder pressure sensor 53 may be omitted if it is unnecessary.

In the above-described embodiment, the sensor output of the above-described fuel pressure sensor 20a is sequentially acquired at an interval (i.e., in a cycle) of 20 μsec. The acquisition interval may be arbitrarily changed in a range capable of grasping the tendency of the pressure fluctuation mentioned above. However, according to the experiment performed by the inventors, an interval shorter than 50 μsec is effective.

It is also effective to provide a rail pressure sensor for measuring the pressure in the common rail 12 in addition to the above-described fuel pressure sensor 20a. With such the construction, the pressure in the common rail 12 (the rail pressure) can be also acquired in addition to the pressure measurement value obtained by the above-described fuel pressure sensor 20a. As a result, the fuel pressure can be sensed with higher accuracy.

The kind and the system configuration of the engine as the control target can also be arbitrarily modified in accordance with the use and the like.

In the above embodiment, the present invention is applied to the diesel engine as an example. However, fundamentally, the present invention can be also applied to a gasoline engine of a spark ignition type (specifically, direct-injection engine) or the like in a similar way. The device and the system according to the present invention can be applied not only to the injector that injects the fuel directly into the cylinder but also to an injector that injects the fuel to an intake passage or an exhaust passage of the engine in order to control the fuel injection characteristic or the like of the injector. Moreover, the target injector is not limited to the injector illustrated in FIG. 2 but is arbitrary. For example, an injector that opens/closes an injection hole with a needle or an injector of an outside valve opening type may be employed. When such the change of the construction is applied to the above-described embodiment, it is desirable to appropriately change the details of the various kinds of processing (programs) mentioned above into the optimum forms in accordance with the actual construction (as design change).

In the above embodiment and the modifications, it is assumed that various kinds of software (programs) are used. Alternatively, the same function may be realized by hardware such as dedicated circuits While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A fuel injection control device for a fuel supply system that injects fuel to an inside of a cylinder as a part of a target engine for performing fuel combustion, to an intake passage of the engine or to an exhaust passage of the engine with a predetermined injector, the fuel injection control device comprising:

a fuel pressure sensing means for sequentially sensing fuel pressure fluctuating with the injection of the injector;

a diagram detecting means for detecting a diagram as a profile indicating a transition of an injection rate at a present time based on a transition of the fuel pressure sequentially sensed by the fuel pressure sensing means, the injection rate being equivalent to a fuel quantity injected from the injector per unit time; and an injection varying means for varying an injection command to the injector or an injection condition of the injector by comparing the diagram that is the profile indicating the transition of the injection rate and that is detected by the diagram detecting means and a predetermined basic diagram such that the diagram as the actual profile indicating the transition of the injection rate becomes the same kind as the basic diagram and such that an area of the detected diagram approximates to an area of the basic diagram, wherein the basic diagram is one of a triangle, a trapezoid and a rectangle or a diagram made by combining multiple pieces of at least one kind of the triangle, the trapezoid and the rectangle.

2. The fuel injection control device as in claim 1, further comprising:

a basic diagram varying means for variably setting at least one of the basic diagram and a parameter of the basic diagram based on a predetermined parameter.

3. The fuel injection control device as in claim 1, wherein the injection varying means varies the injection command to the injector or the injection condition of the injector based on the diagram that is the profile of the transition of the injection rate and that is detected by the diagram detecting means and the basic diagram such that the diagram as the actual profile of the transition of the injection rate becomes a diagram having the same area as the basic diagram.

4. The fuel injection control device as in claim 1, wherein the injection varying means varies the injection command to the injector or the injection condition of the injector based on the diagram that is the profile of the transition of the injection rate and that is detected by the diagram detecting means and the basic diagram such that at least one of timing of a corner and an injection rate defined by the diagram as the actual profile of the transition of the injection rate coincides with that of the basic diagram.

5. The fuel injection control device as in claim 1, wherein the injection varying means varies the injection command to the injector or the injection condition of the injector by comparing the diagram detected by the diagram detecting means with the basic diagram to approximate a predetermined parameter of the detected diagram to a corresponding parameter of the basic diagram.

6. The fuel injection control device as in claim 5, wherein the basic diagram is the trapezoid, and the injection varying means approximates the area of the detected diagram to that of the basic diagram in priority to timings of four corners or the injection rate defined by the detected diagram.

7. The fuel injection control device as in claim 6, wherein the injection varying means approximates a first corner of the trapezoid that appears at the earliest timing in a chronological order among the four corners of the detected diagram to that of the basic diagram in priority to a fourth corner of the trapezoid that appears at the latest timing in the chronological order among the four corners.

8. The fuel injection control device as in claim 7, wherein the injection varying means approximates the four corners of the detected diagram to those of the basic diagram in a priority order of the first corner of the trapezoid that appears at the earliest timing in the chronological order, the fourth corner of the trapezoid that appears at the latest timing in the chronological order, a second corner of the trapezoid that appears at second timing in the chronological order, and a third corner of the trapezoid that appears at third timing in the chronological order.

9. The fuel injection control device as in claim 5, wherein the basic diagram is the trapezoid, and the injection varying means compares the detected diagram detected by the diagram detecting means and the basic diagram and produces the injection command to the injector such that rising timings of the first corners of the both diagrams coincide with each other if a deviation amount between the rising timings of the first corners is greater than a permissible level when both of the detected diagram and the basic diagram are the trapezoids and a deviation amount between rising angles of the first corners of the detected diagram and the basic diagram is within another permissible level, the first corner of the detected diagram or the basic diagram appearing at the earliest timing among four corners of the trapezoid in a chronological order.

10. The fuel injection control device as in claim 5, wherein the basic diagram is the trapezoid, and the injection varying means compares the detected diagram detected by the diagram detecting means and the basic diagram and produces the injection command to the injector such that return timings of fourth corners of the both diagrams coincide with each other if a deviation amount between the return timings of the fourth corners is greater than a permissible level when both of the detected diagram and the basic diagram are the trapezoids and a deviation amount between return angles of the fourth corners of the detected diagram and the basic diagram is within another permissible level, the fourth corner of the detected diagram or the basic diagram appearing at the latest timing among four corners of the trapezoid in a chronological order.

11. The injection control device as in claim 5, wherein the basic diagram is the trapezoid, and the injection varying means compares the detected diagram detected by the diagram detecting means and the basic diagram and produces the injection command to the injector to move rising timing of a first corner of the trapezoid of the detected diagram and stabilization timing of a second corner of the trapezoid of the detected diagram in a direction for coinciding an area of the detected diagram with an area of the basic diagram without performing adjustment of a rising angle of the first corner when both of the detected diagram and the basic diagram are the trapezoids and a deviation amount between rising angles of the first corners of the detected diagram and the basic diagram is greater than a permissible level, the first corner of the trapezoid appearing at the earliest timing among four corners of the trapezoid in a chronological order and the second corner appearing at second timing among the four corners of the trapezoid in the chronological order.

12. The fuel injection control device as in claim 11, wherein when the rising timing of the first corner of the detected diagram coincides with the rising timing of the first corner of the basic diagram, the injection varying means moves each of the rising timing and the stabilization timing of the detected diagram by a half of a deviation amount between the stabilization timings of the second corners of the detected diagram and the basic diagram.

13. The fuel injection control device as in claim 5, wherein
the basic diagram is the trapezoid, and
the injection varying means compares the detected diagram detected by the diagram detecting means and the basic diagram and produces the injection command to the injector to move falling timing of a third corner of the trapezoid of the detected diagram and return timing of a fourth corner of the trapezoid of the detected diagram in a direction for coinciding an area of the detected diagram with an area of the basic diagram without performing adjustment of a return angle of the fourth corner of the trapezoid when both of the detected diagram and the basic diagram are the trapezoids and a deviation amount between return angles of the fourth corners of the detected diagram and the basic diagram is greater than a permissible level, the fourth corner of the trapezoid appearing at the latest timing among four corners of the trapezoid in a chronological order.

14. The fuel injection control device as in claim 13, wherein
when the return timings of the fourth corners of the detected diagram and the basic diagram coincide with each other, the injection varying means moves each of the falling timing and the return timing of the detected diagram by a half of a deviation amount between the falling timings of the third corners of the detected diagram and the basic diagram.

15. The fuel injection control device as in claim 1, wherein the injection varying means varies injection pressure of the injector as the injection condition.

16. The fuel injection control device as in claim 15, wherein
the injection varying means varies the injection pressure of the injector by varying a pumping quantity of a fuel pump that performs pumping supply of the fuel to the injector.

17. The fuel injection control device as in claim 15, wherein
the injection varying means varies the injection pressure of the injector by varying pumping timing of a fuel pump that performs pumping supply of the fuel to the injector.

18. The fuel injection control device as in claim 15, wherein
the injection varying means varies the injection pressure of the injector by varying a valve opening degree of a pressure reducing valve provided to the injector or to a fuel supply passage for the injector.

19. The fuel injection control device as in claim 1, wherein the injection varying means varies the injection command to the injector by updating a correction coefficient for a predetermined reference map, in which the injection command used when the injection control is performed with the injector is written.

20. The fuel injection control device as in claim 1, wherein the injection varying means produces the injection command to the injector such that an injection result obtained based on the fuel pressure transition sequentially sensed with the fuel pressure sensing means during a present combustion cycle of the target engine is reflected in an injection in a subsequent combustion cycle.

21. The fuel injection control device as in claim 1, wherein the injection varying means uses a pressure transition sensed up to the present time in a combustion cycle of the target engine based on the fuel pressure transition sequentially sensed by the fuel pressure sensing means to produce the injection command to the injector about a predetermined operation concerning the fuel injection of the injector to be performed after the present time in the same cycle.

22. The fuel injection control device as in claim 1, wherein
the injector has a fluid control valve for controlling an inflow of a fluid to a predetermined space and an outflow of the fluid from the same space and a needle that performs reciprocation operation inside a valve body of the injector in accordance with a change in pressure in the space accompanying the inflow and the outflow of the fluid to open and close an injection hole or a fuel supply passage extending to the injection hole, thereby performing valve opening and valve closing of the injector.

23. The fuel injection control device as in claim 1, wherein
the injector has a needle that performs reciprocation operation inside a valve body of the injector to open and close an injection hole or a fuel supply passage extending to the injection hole, thereby performing valve opening and valve closing of the injector, and
the injector continuously varies a reciprocation movement amount of the needle in accordance with the injection command to the injector.

24. The fuel injection control device as in claim 1, wherein
the fuel supply system is a common rail fuel injection system that has a common rail for accumulating the fuel to be supplied to the injector under pressure and at least one fuel pressure sensor for sensing pressure of the fuel flowing through an inside of a fuel passage extending from the common rail to a fuel injection hole of the injector at a predetermined point downstream of a neighborhood of a fuel discharge hole of the common rail with respect to a fuel flow direction, and
the fuel pressure sensing means sequentially senses the fuel pressure based on an at least one output of the at least one fuel pressure sensor.

25. The fuel injection control device as in claim 1, wherein
the fuel supply system is a common rail fuel injection system that has a common rail for accumulating the fuel to be supplied to the injector under pressure, a fuel pulsation reducing means provided in a connection between the common rail and a fuel discharge pipe of the common rail for reducing a fuel pulsation transmitted to the common rail through the fuel discharge pipe, and at least one fuel pressure sensor for sensing pressure of the fuel flowing through an inside of a fuel passage extending from the common rail to a fuel injection hole of the injector at a predetermined point downstream of the fuel pulsation reducing means with respect to a fuel flow direction, and
the fuel pressure sensing means sequentially senses the fuel pressure based on at least one output of the at least one fuel pressure sensor.

26. The fuel injection control device as in claim 25, wherein
the fuel pulsation reducing means is constituted by an orifice, a flow damper, or a combination of the orifice and the flow damper.

27. The fuel injection control device as in claim 24, wherein
at least one of the fuel pressure sensors is provided inside the injector or near the injector.

28. The fuel injection control device as in claim 24, wherein at least one of the fuel pressure sensors is provided at a position in the fuel discharge pipe of the common rail closer to the fuel injection hole of the injector than the common rail.

29. The fuel injection control device as in claim 24, wherein
the fuel pressure sensing means sequentially obtains a sensor output of the fuel pressure sensor at an interval short enough to create a profile of a pressure transition waveform with the sensor output.

30. The fuel injection control device as in claim 24, wherein the fuel pressure sensing means sequentially obtains the sensor output of the fuel pressure sensor at an interval shorter than 50 microseconds.

31. A method of controlling a fuel supply system that injects fuel to an inside of a cylinder as a part of a target engine for performing fuel combustion, to an intake passage of the engine or to an exhaust passage of the engine with a predetermined injector, the method comprising:
sequentially sensing fuel pressure fluctuating with the injection of the injector;
detecting a diagram as a profile indicating a transition of an injection rate at a present time based on a transition of the sequentially sensed fuel pressure, the injection rate being equivalent to a fuel quantity injected from the injector per unit time; and
varying an injection command to the injector or an injection condition of the injector by comparing (i) the diagram that is the profile indicating the transition of the injection rate and that is detected and (ii) a predetermined basic diagram such that the diagram as the actual profile indicating the transition of the injection rate becomes the same kind as the basic diagram and such that an area of the detected diagram approximates to an area of the basic diagram,
wherein the basic diagram is one of a triangle, a trapezoid and a rectangle or a diagram made by combining multiple pieces of at least one kind of the triangle, the trapezoid and the rectangle.

* * * * *